(12) United States Patent
Kravec et al.

(10) Patent No.: US 7,243,165 B2
(45) Date of Patent: Jul. 10, 2007

(54) PARALLEL PATTERN DETECTION ENGINE

(75) Inventors: Kerry A. Kravec, Fishkill, NY (US); Ali G. Saidi, Ann Arbor, MI (US); Jan M. Slyfield, San Jose, CA (US); Pascal R. Tannhof, Fontainebleau (FR)

(73) Assignee: International Business Machines Corporation, Armonk, NY (US)

( * ) Notice: Subject to any disclaimer, the term of this patent is extended or adjusted under 35 U.S.C. 154(b) by 549 days.

(21) Appl. No.: 10/757,187

(22) Filed: Jan. 14, 2004

(65) Prior Publication Data

US 2005/0154802 A1   Jul. 14, 2005

(51) Int. Cl.
*G06F 3/00* (2006.01)
*G06K 9/00* (2006.01)
*G06K 9/62* (2006.01)

(52) U.S. Cl. .......................... 710/1; 382/181; 382/209
(58) Field of Classification Search ..................... None
See application file for complete search history.

(56) References Cited

U.S. PATENT DOCUMENTS

| | | | | |
|---|---|---|---|---|
| 4,384,273 A | | 5/1983 | Ackland et al. ............... 382/34 |
| 4,783,803 A | | 11/1988 | Baker et al. ................... 381/42 |
| 5,014,327 A | * | 5/1991 | Potter et al. ................. 382/220 |
| 5,051,947 A | * | 9/1991 | Messenger et al. ............. 707/3 |
| 5,377,348 A | | 12/1994 | Lau et al. .................... 395/600 |
| 5,383,142 A | | 1/1995 | Chung ................... 364/715.11 |
| 5,386,384 A | | 1/1995 | Pedroni et al. ............. 365/183 |
| 5,396,588 A | | 3/1995 | Froessl ........................ 395/145 |
| 5,548,775 A | * | 8/1996 | Hershey ...................... 711/109 |
| 5,629,752 A | | 5/1997 | Kinjo ........................... 355/35 |
| 5,657,396 A | * | 8/1997 | Rudolph et al. ............ 382/190 |
| 5,684,701 A | | 11/1997 | Breed ................... 364/424.055 |
| 6,587,852 B1 | * | 7/2003 | Svingen et al. ................ 707/6 |
| 6,675,163 B1 | * | 1/2004 | Bass et al. ....................... 707/6 |
| 2003/0229636 A1 | * | 12/2003 | Mattausch et al. ............. 707/6 |
| 2004/0215593 A1 | * | 10/2004 | Sharangpani et al. .......... 707/1 |

OTHER PUBLICATIONS

Jie Li et al. "A Parallel Multi-Layered Pipeline with Feedback Mechanism for Mass Pattern Matching," Proceedings of the International Conference on Parallel and Distributed Processing Techniques and Applications. PDPTA'2000, vol. 4, pp. 2191-2197.

* cited by examiner

*Primary Examiner*—Donald Sparks
*Assistant Examiner*—David Martinez
(74) *Attorney, Agent, or Firm*—Winstead PC

(57) ABSTRACT

A parallel pattern detection engine (PPDE) comprise multiple processing units (PUs) customized to do various modes of pattern recognition. The PUs are loaded with different patterns and the input data to be matched is provided to the PUs in parallel. Each pattern has an Opcode that defines what action to take when a particular data in the input data stream either matches or does not match the corresponding data being compared during a clock cycle. Each of the PUs communicate selected information so that PUs may be cascaded to enable longer patterns to be matched or to allow more patterns to be processed in parallel for a particular input data stream.

22 Claims, 18 Drawing Sheets

Case 1: Reload if there is NOT a pattern match and the match OPcode is set
Partial expression to match: "ABC"

Case 2: Reload if there is a pattern match and the inverse OPcode is set for a pattern byte
Partial Expression to match : "C!DE"

Case 4: Increment if there is NOT a pattern match and the inverse OPcode is set
Partial expression to match: "I!LK"

Case 5: Increment if there is a pattern match and the match OPcode is set
Partial Expression to match: "LMN"

Case 6: Increment if there is NOT a pattern match and the wildcard OPcode is set
Partial expression to match: "O•Q"

PARALLEL PATTERN DETECTION ENGINE

CROSS REFERENCE TO RELATED APPLICATIONS

The present invention is related to the following U.S. patent applications which are incorporated herein by reference:

Ser. No. 10/757,673 entitled "A Configurable Bi-Directional Bus For Communicating Between Autonomous Units" filed Jan. 14, 2004; and Ser. No. 10/756,904 entitled "Intrusion Detection Using A Network Processor And A Parallel Pattern Detection Engine" filed Jan. 14, 2004.

TECHNICAL FIELD

The present invention relates in general to methods and systems for performing fast partial or exact pattern matching.

BACKGROUND INFORMATION

Recognizing patterns within a set of data is important in many fields, including speech recognition, image processing, seismic data, etc. Some image processors collect image data and then pre-process the data to prepare it to be correlated to reference data. Other systems, like speech recognition, are real time where the input data is compared in real time to reference data to recognize patterns. Once the patterns are "recognized" or matched to a reference, the system may output the reference. For example, a speech recognition system may output equivalent text to the processed speech patterns. Other systems, like biological systems, may use similar techniques to determine sequences in molecular strings like DNA.

In some systems, there is a need to find patterns that are imbedded in a continuous data stream. In non-aligned data streams, there are some situations where patterns may be missed if only a single byte-by-byte comparison is implemented. The situation where patterns may be missed occurs when there is a repeated or nested repeating patterns in the input stream or the pattern to be detected. A reference pattern (RP) containing the sequence that is being searched for is loaded into storage where each element of the sequence has a unique address. An address register is loaded with the address of the first element of the RP that is to be compared with the first element of the input pattern (IP). This address register is called a "pointer." In the general case, a pointer may be loaded with an address that may be either incremented (increased) or decremented (decreased). The value of the element pointed to by the pointer is retrieved and compared with input elements (IEs) that are clocked or loaded into a comparator.

In pattern recognition, it is often desired to compare elements of an IP to many RPs. For example, it may be desired to compare an IP resulting from scanning a finger print (typically 1 Kilobyte for certain combinations of features defined in fingerprint technology) to a library of RPs (all scan results on file). To do the job quickly, elements of each RP may be compared in parallel with elements in the IP. Each RP may have repeating substrings (short patterns) which are smaller patterns embedded within the RP. Since a library of RPs may be quite large, the processing required may be considerable. It would be desirable to have a way of reducing the amount of storage necessary to hold the RPs. If the amount of data used to represent the RPs could be reduced, it may also reduce the time necessary to load and unload the RPs. Parallel processing may also be used where each one of the RPs and the IP are loaded into separate processing units to determine matches.

Other pattern recognition processing in biological systems may require the comparison of an IP to a large number of stored RPs that have substrings that are repeated. Processing in small parallel processing units may be limited by the storage size required for the RPs. Portable, inexpensive processing systems for chemical analysis, biological analysis, etc., may also be limited by the amount of storage needed to quickly process large numbers of RPs.

Pattern detection or recognition is a bottleneck in many applications today and software solutions cannot achieve the necessary performance. It is desirable to have a a hardware solution for matching patterns quickly that is expandable. It is also desirable to have a system that allows multiple modes of pattern matching. Some applications require an exact match of a pattern in an input data stream to a desired target pattern. In other cases, it is desirable to determine the longest match, the maximum number of characters matching, or a "fuzzy" match where various character inclusions or exclusions are needed.

There is, therefore, a need for a method and system for pattern detection that is mode programmable and comprises a large number of parallel processing units that is expandable to enable variable pattern lengths to be matched as well as allowing additional processing units to be added to increase matching speed.

SUMMARY OF THE INVENTION

A parallel pattern detection engine comprises a large number of small processing units building blocks that perform pattern detection. These processing units have multiple modes of pattern detection and each has memory for storing patterns. A large parallel interface bus supplies input data to an input buffer. Selected input data is coupled in parallel to each processing unit so that each processing unit compares, in parallel, input data received on the parallel bus. Each processing unit is also coupled to a parallel address bus so that detection pattern data may be selectively loaded into each processing unit. The addresses of each processing unit comprises its identification (ID). Processing units that generate a match of its detection pattern to a pattern in the input data, according to its specific mode, have their corresponding ID forwarded by an ID selection unit to an output buffer. The data from the output buffer is coupled to the interface bus for sending results of a particular input data stream comparison. Each of the processing units has a "chaining" or cascading communication interface that allows a particular processing unit to be coupled to its corresponding adjacent processing units for generating larger detection patterns greater than a single PU can handle or for determining specific types of pattern matching. The parallel input bus structure and the chaining communication interface facilitate adding groups of the parallel pattern detection engines to create larger systems for speed or for handling a larger number of patterns or for both purposes.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
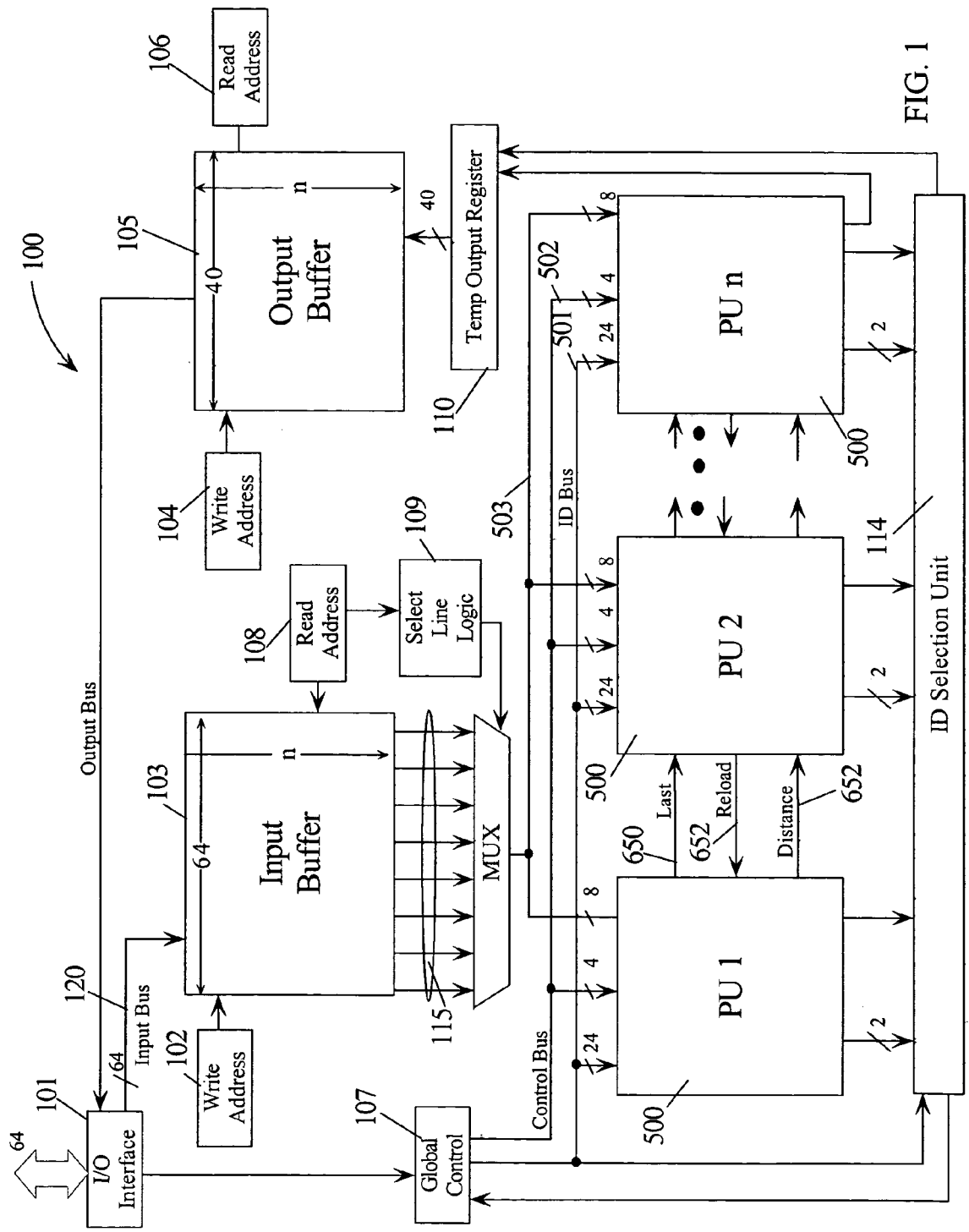
FIG. 1 is a block diagram of the architecture of a parallel pattern detection engine (PPDE) according to embodiments of the present invention comprising N processing units.

In the following description, numerous specific details are set forth to provide a thorough understanding of the present invention. However, it will be obvious to those skilled in the art that the present invention may be practiced without such specific details. In other instances, well-known circuits may be shown in block diagram form in order not to obscure the present invention in unnecessary detail. For the most part, details concerning timing, data formats within communication protocols, and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Sequential matching of a data stream in software is currently a central processing unit ("CPU") intensive task. Thus, high performance is difficult. The pattern matching processing unit (hereafter PU) architecture can provide high performance matching because it is a piece of hardware dedicated to pattern matching. The PU provides more efficient searching (matching) because every input pattern is being matched in parallel to a corresponding target pattern. Parallel matching is possible because a virtually unlimited number of the PUs may be cascaded. Additionally, each PU has built-in functionality that can reduce the number of necessary PUS by incorporating modes that allow matching comprising wild cards (don't cares in the target pattern), multiple wildcards, and inverse operations. The PU architecture's fast pattern detection capabilities are useful in network intrusion detection, database scanning, and mobile device security applications. Additionally, with their built-in distance computation, "fuzzy" pattern detection may be implemented which are particularly useful in image processing and life sciences applications.

Figure 5:
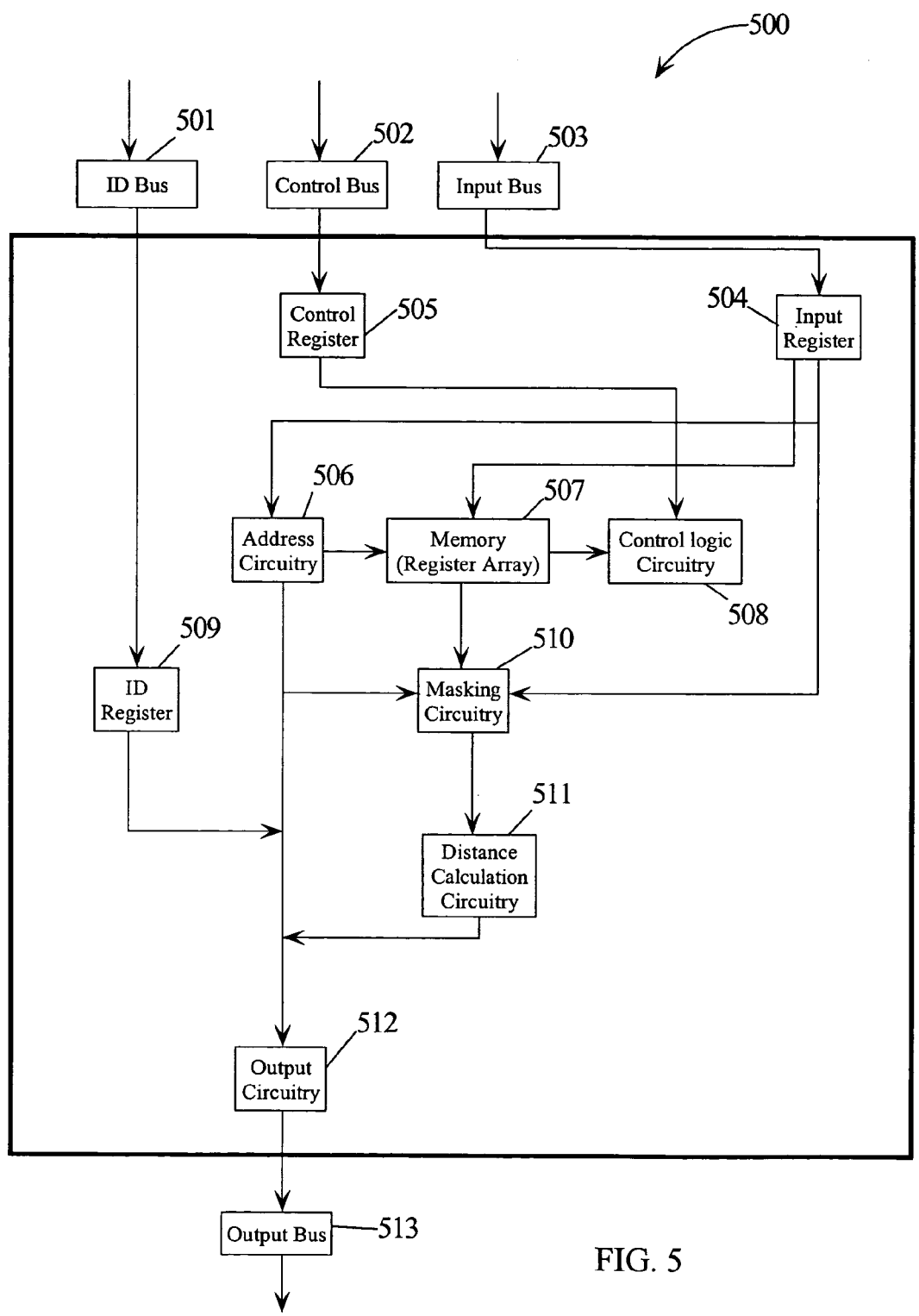
FIG. 5 is an overview block diagram of an individual PU according to embodiments of the present invention.

FIG. 5 is an overview block diagram of a PU 500 according to embodiments of the present invention. PU 500 receives inputs from identification (ID) bus 501, control bus 502 and input data bus 503. The inputs of the buses are buffered in ID register 509, control register 505 and input data register 504. Control data from control register 505 is coupled to control logic circuitry 508 which also receives data from memory 507. Input data from input data register 504 is coupled to memory 507, address circuitry 506, masking circuitry 510. Address circuitry 506 couples addresses to memory 507. Address circuitry 506 also couples to masking circuitry 510 and output circuitry 512. Output circuitry 512 receives data from ID register 509, address circuitry 506 and distance circuitry 511 and selectively couples data to output bus 513.

Figure 6:
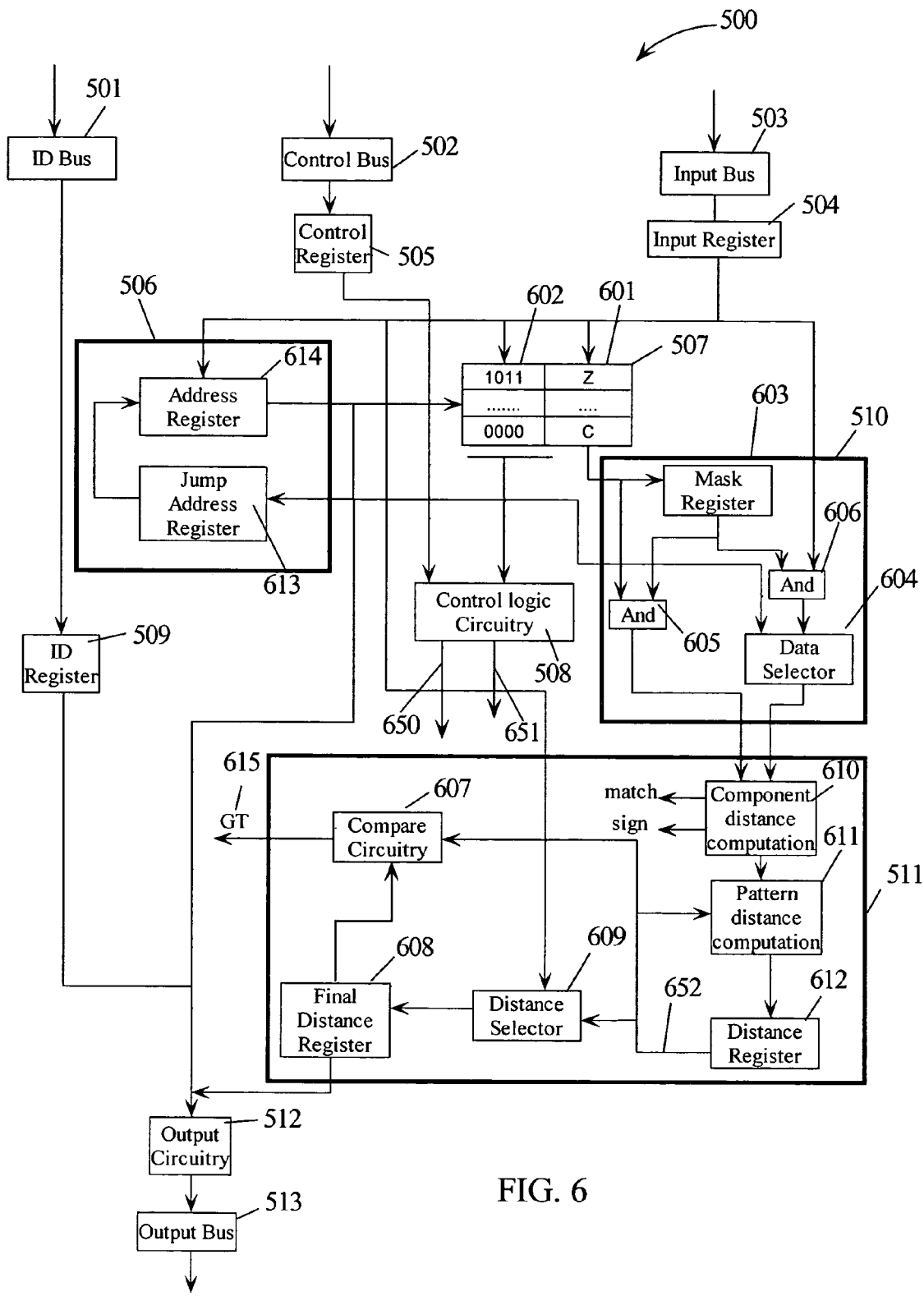
FIG. 6 is a detailed block diagram of an individual PU according to embodiments of the present invention.

FIG. 6 is another more detailed block diagram of PU 500 according to embodiments of the present invention. Blocks shown in FIG. 5 are repeated for clarity. PU 500 receives inputs from identification (ID) bus 501, control bus 502 and input data bus 503. The inputs of the buses are buffered in ID register 509, control register 505 and input data register 504. Memory 507 is a register array having fields for pattern data 601 and operation codes (Opcodes) 602. Memory 507 stores patterns that are being compared to input data. Opcodes 602 define what type of pattern compare is being executed. Opcodes 602 and control bits from control register 505 are coupled to control logic circuitry 508. Pattern data 601 are coupled to mask register 603 in mask circuitry 510. Outputs of mask register 603 are combined in logic AND 605 to generate inputs to component distance computation unit 610 in distance circuitry 511. Likewise outputs of mask register 603 are combined in a logic AND 606 to form inputs to data selector 604. Data selector 604 selects between input data from input register 504 and addresses from address register 614 to provide inputs to component distance computation unit 610. Address register 614 couples address to memory 507. Component distance computation unit 610 couples outputs to Pattern distance computation unit 611. Present distance computation results are stored in distance register 612. The present distance computation result is coupled back to pattern distance computation unit 611 and to compare circuitry 607. The output of distance register 612 is compared to the value stored in the final distance register to generate the output GT 615. GT Stand for "greater than" and this signal is set active when the value stored in the final distance register is greater than the value stored in the distance register. The final distance value in store in final distance register 608 is selected from either input register 504 or distance register 612 in distance selector 609.

Each PU 500 has limited memory to store pattern data 601. If a pattern is long, it is possible to merge several PU 500 units for storing a long sequence of pattern data 601. For example if two PU 500 are used, then during the beginning of a pattern detection phase, the memory 507 of the first of the two PU 500 units is used. The address pointer of the first PU 500 is modified according to the matching mode and the operation codes 602. When the address pointer reaches its last memory position a last signal 650 is sent to the second of the two PU 500 units in order to continue the matching process using the remainder of the pattern data 601 stored in the second PU 500. Control data on control bus 502 is used to initialize the second PU 500, in this case, so that it only starts matching when it receives the "last" signal 650 from the first PU 500. Also in this case, if a "reload" pointer address is indicated during the matching process, the address pointer of both of the two PU 500 units used for the long sequence of pattern data 601 must be updated. This is accomplished by sending a "reload" signal 651 to the appropriate PU 500 (containing the initial pattern 601 bytes). Since the number of bytes in a sequence of pattern data 601 is not specifically limited, more than two PU 500 units may be used in the manner discussed. Again initialization control data on control bus 502 configures a PU 500 to execute as an independent PU or as a cascade PU.

When the matching mode is a "fuzzy" match, pattern distance computation unit 611 calculates a present distance value stored in distance register 612. If two or more PU 500 units are used in cascade to store pattern data 601 used for a fuzzy match, then the distance value is sent on distance signal 652 to the next PU 500 in a cascade so that a final distance value may be determined and stored in final distance register 608 of the last PU 500 in a cascade.

Figure 7:
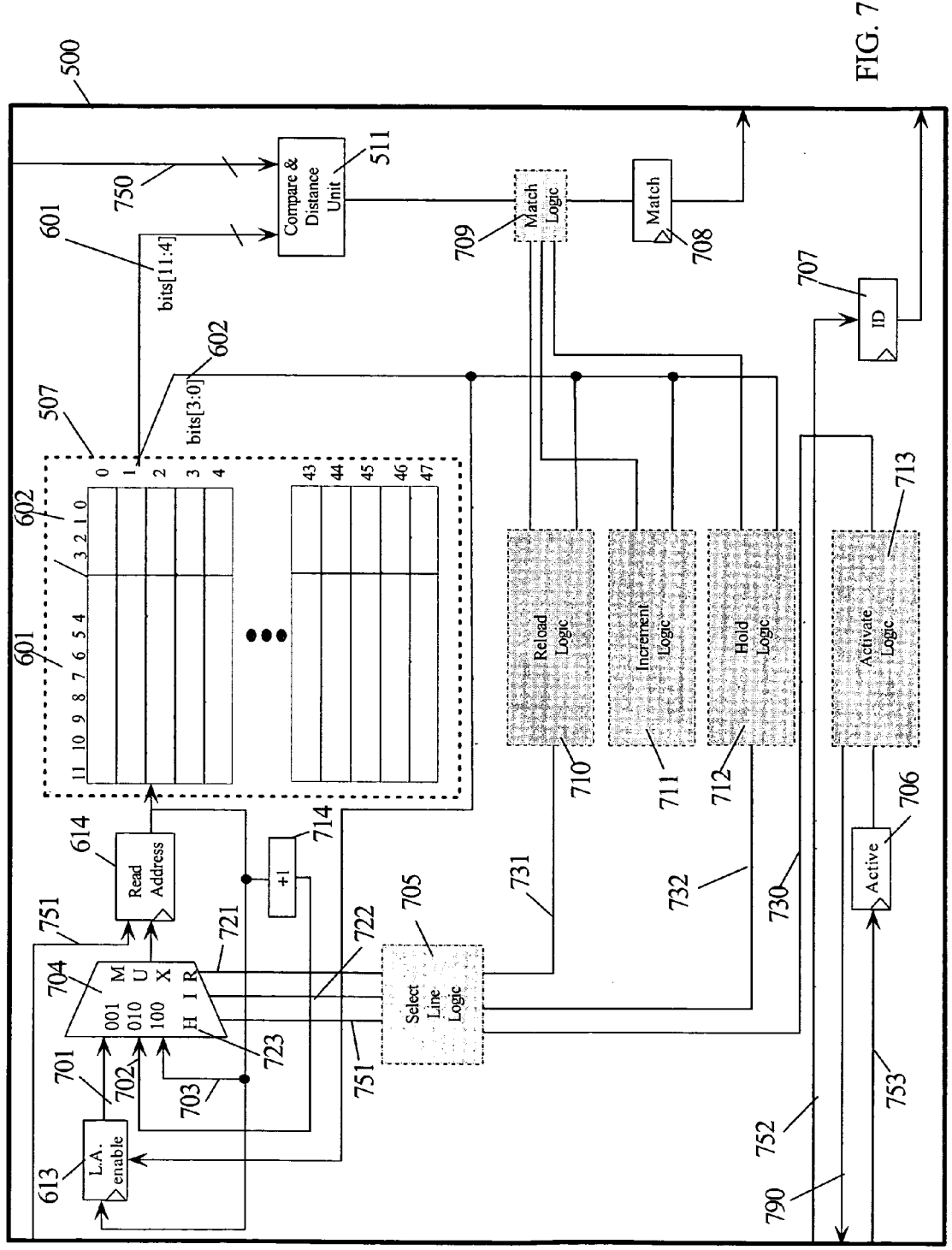
FIG. 7 is a detailed block diagram of a PU architecture.

FIG. 7 is a block diagram of more details of circuitry PU 500. Patterns to be compared are preloaded into memory (register file) 507 as bytes wherein each bit is stored as 8 bits in bits [11:4]. Each Opcode 602 is stored in bits [3:0]. An input data stream 750 are compared to stored bytes in memory 507 as determined by read address 614. Compare and distance unit 511 computes a distance for the compare operation. Match logic 709 generates logic signals that are coupled to reload logic 710, increment logic 711 or hold logic 712. Various types of matching are possible as determined by Opcodes 602 stored with each byte of the pattern in memory 507. Depending on the Opcode 602 and the results of the compare in compare and distance unit 511, the logic in reload logic 710, increment logic 711 and hold logic 712 determine whether to hold the present read address, increment the present read address to the next value or reload the read address to its initial value to start comparing at the beginning of the pattern. Select line logic 705 is enabled by activate logic 713 via activate signal 730. Depending on the output logic states of reload logic 710, increment logic 711 and hold logic 712, one of the inputs to multiplexer (MUX) 704, hold 723, increment 722 or reload 721 will be a logic one thereby selecting input 703, 702 or 701 respectively. Increment by one 714 adds one to the present read address and generates input 702. The present read address is coupled into hold 703 and the first address in the pattern is coupled from 714. Register 614 was loaded with the first address in the pattern under control of Opcodes 602. Packet reset signal 751 resets the read address. If active signal 706 is a logic zero, then select line logic 705 is degated and all the inputs hold 703, increment 702 and reload 701 are a logic zero and MUX 704 is degated. To allow cascading of multiple PUs (e.g., PU 500), the signal 730, and ID 707 are coupled to the next PU. Likewise, PU 500 receives ID 752 and active signal 753 from a preceding PU. Activate logic 713 is coupled to the previous PU by signal line 790.

Figure 8:
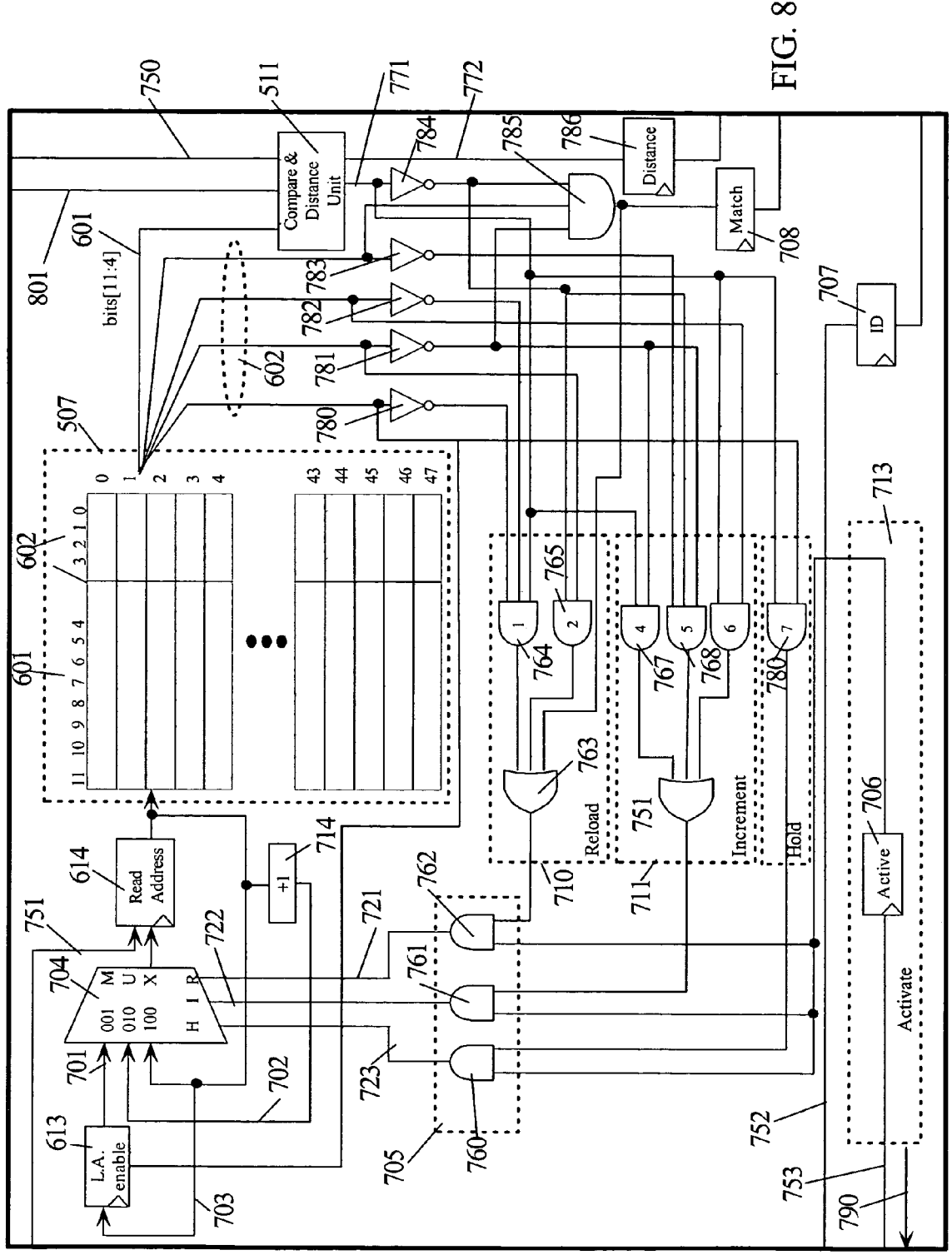
FIG. 8 is a circuit diagram of a specific implementation of a single PU.

FIG. 8 is a more detailed circuit diagram of circuitry of PU 500. FIG. 8 illustrates a more detailed circuitry for select line logic 705 (AND gates 760–762), reload logic 710 (OR gate 763 and AND gates 764–765), increment logic 711 (OR gate 766 and AND gates 767–769) and hold logic 712 (AND gate 770). Inverters 780–784 serve to generate the complement of the Opcode 602 signals.

The following description may refer between FIGS. 5, 6, 7, and 8 as these illustrate PU 500 in various degrees of detail.

The fast pattern match technology utilizes local memory (e.g., register array 507) in each PU 500 which contains a pattern 601 and flag bits (Opcodes 602) that specify options. These options may include a single wildcard, multiple wildcard, last, and inverse matching operations. A single wildcard matching means that a match is indicated if the byte having the single wildcard matching Opcode 602 set matches the current byte in an input stream. A multiple wildcard matching means that a match is indicated if an indeterminate number of bytes in sequence not match the byte with the multiple wildcard Opcode 602. Inverse matching means a match is indicated if every byte except the byte with the inverse Opcode 602 matches a byte in an input stream. Last Opcode 602 means that the byte is the last byte in a pattern.

Global registers include ID register 509, read address register 614, control register 505 and registers in register array 507. Additional global registers, active register 706, match register 708 and select register (not shown) may be used to designate PU 500 as active, matched, or selected for writing configuration data. The ID of a PU 500 is an ID that is unique across a chip containing multiple PUs and is used to identify what pattern has been detected in a data stream being coupled in parallel to more than one PU 500. The counter 714 is used to index through the stored pattern 601 for comparison to bytes 801 in an input data stream (from input bus 503) and the comparator (not shown) in compare unit 511 compares the pattern 601with the input data 801 one byte at a time.

When PU 500 comes online, all registers are initialized to zero (reset). Next PU 500 receives unique ID from the input bus 503 which is stored in ID register 509. PU 500 then waits until it receives additional commands. The first command is a select command which activates PU 500 to receive further configuration commands that apply to PU 500 only. At this point the global registers may be loaded. Bytes of data are sent to the register array 507 which include the pattern data 601 and the corresponding Opcode data 602. When the configuration is complete and the active register 706 is set to "active", PU 500 waits for the packet reset signal 802 to enable the read address 614. This indicates that a new input packet is being sent to the PU 500 to begin the matching phase.

During the matching phase, one byte is sent to PU 500 at each clock cycle. PU 500 compares the byte stored (601) in the current register array position (determined by the address 614) in register array 507 with the input byte in input register 504 and checks the Opcode (602) for the byte in the current register array position of the pattern stored in 601. If there is a match or the Opcode 602 is set to a single wild card match, the pointer is incremented to select the next read address in address register 614. If the Opcode 602 for the current byte in pattern 601 is set to multiple wildcard, the pointer to address register 614 holds its current value. If a match was not found, then the pointer is reloaded. This process continues until the pointer is at the last position of a pattern and a match occurs. At this point, the match register 708 is set in PU 500. The final phase of the process is to report the found match. If the match register 708 is set, the output logic circuitry 512 sends the ID of PU 500 to the output bus 513.

FIG. 1 is a block diagram of a parallel pattern matching engine (PPDE) 100 integrated circuit (IC) architecture. PPDE 100 provides multiple mode pattern matching and has a highly flexible, massively parallel architecture. PPDE 100 can perform exact, fuzzy, longest and maximum character pattern matching. Some of the possible applications that can benefit from the capabilities of PPDE 100's high performance pattern matching are: network intrusion detection, database search image processing, lossless compression, and real-time data processing (sound, EKG, MRI, etc.). The architecture of PPDE 100 is highly flexible and scalable and may be adapted to specific applications.

PPDE 100 is an IC comprising multiple PU 500 units and other logic functions. Input/output (I/O) interface 101 couples PPDE chip 100 to system functions. I/O interface 101 couples 64 bits of input data to IC input bus 120 which in turn couples to input buffer 103. Data is written into input buffer 103 in locations determined by write address 102. Data is read from input buffer 103 using read address 108. Data is read from input buffer 103 in 8 bit bytes using multiplexer (MUX) 115 controlled by select line logic 109. Input bus 503 is coupled to each of the N PU 500 units. I/O interface 101 also couples control data to global control 107 which sends 24 bits of ID data on ID bus 501 and 4 bits of control data on control bus 502 to each PU 500 unit (PU1–PUn).

Figure 9:
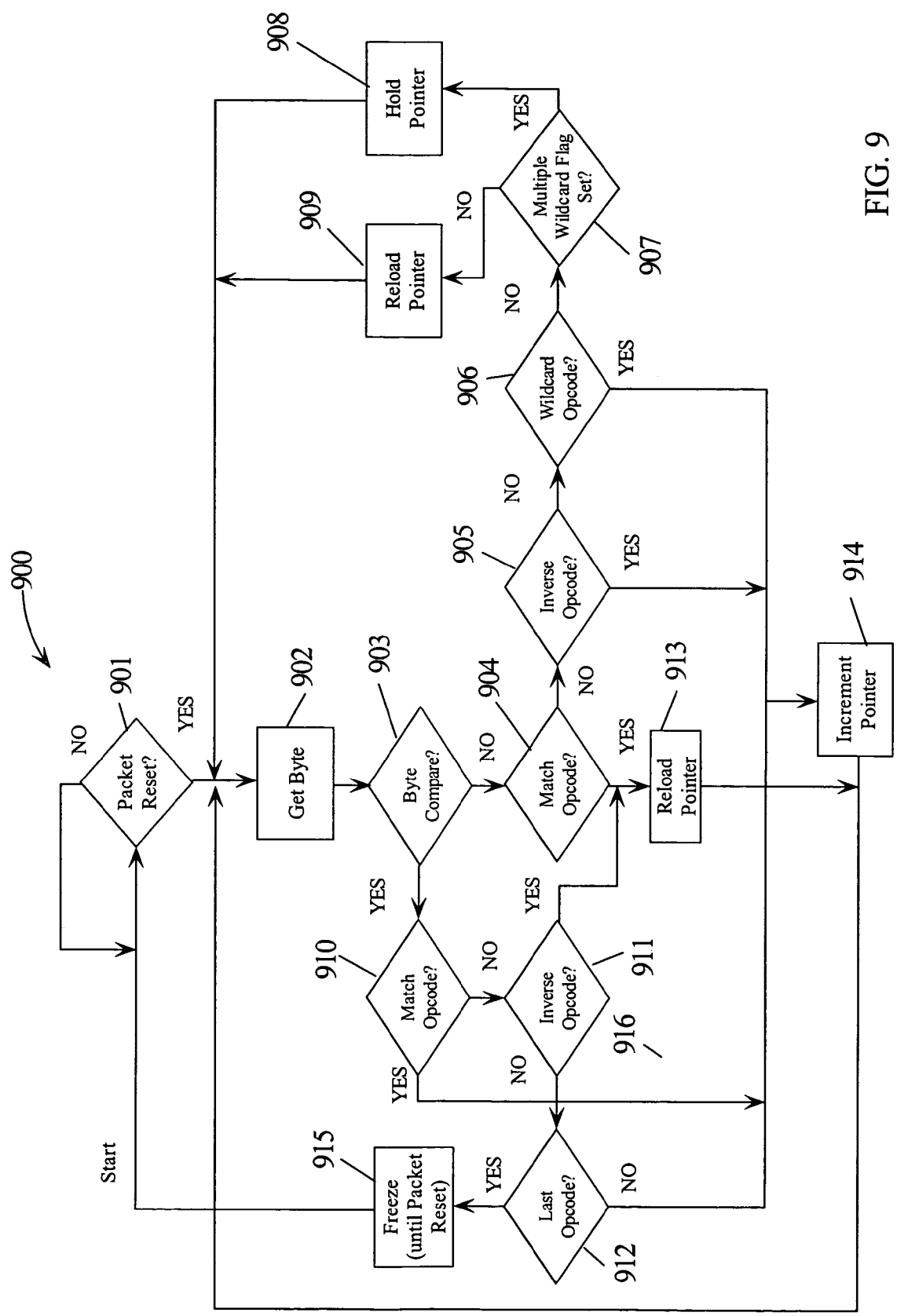
FIG. 9 is a flow diagram of method steps in embodiments of the present invention.

FIG. 9 is a flow diagram of method steps in pattern matching using a PU 500 according to embodiments of the present invention. In step 901, a packet reset is received indicating that configurations of the PU 500 is complete and a new packet (input pattern) is being sent to the PU and it should begin the matching process. In step 902 a first pattern byte of the pattern is retrieved. In step 903, the first pattern byte is compared to the first byte in the input data stream and a test is done to determine if they compare. The first pattern byte is indicated by an address pointer (pointer). If there is a compare in step 903, then a test is done in step 910 to determine if Opcode 602 is set to "match" for the present pattern byte (in this first pass it is the first pattern byte). If the Opcode 602 is set to "match", then the pointer is incremented by one to move to the next pattern byte as this is a desired result. If Opcode 602 for the present pattern byte is not set to "match", then in step 911 Opcode 602 is tested to determine if it is set to "inverse". If Opcode 602 is set to "inverse", then this is not a desired result and the pointer is reloaded back to the first pattern byte in step 913 if it is not already there. A branch is then taken back to step 902. If Opcode 602 is not set to "inverse" in step 911, then Opcode 602 is tested to determine if it is set to "last" indicating the pattern byte is the last byte in the pattern. If Opcode 602 is not set to "last" in step 912, then the pointer is incremented in step 914 and a branch is taken back to step 902. If Opcode 602 is set to "last" in step 912, then the pointer is "frozen" and a branch is taken back to step 901 awaiting a new packet reset to restart match processing.

If the pattern byte and the input data byte do not compare in step 903, then in step 904 a test is done to determine if Opcode 602 is set to "match" for the pattern byte. If Opcode 602 is set to "match" in step 904, then this is not a desired result and the pointer is reloaded back to the first pattern byte in step 913 if it is not already there. A branch is then taken back to step 902. If Opcode 602 is not set to "match" in step 904, then a test is done in step 905 to determine if Opcode 602 is set to "inverse". If Opcode 602 is set to "inverse" in step 905, then this is a desired result and the pointer is incremented in step 914 and a branch is taken back to step 902. If Opcode 602 is not set to "inverse" in step 905, then a test is done in step 906 to determine if Opcode 602 is set to "wildcard". If Opcode 602 is set to "wildcard" in step 906, then this is a desired result and the pointer is incremented in step 914 and a branch is taken back to step 902. If Opcode 602 is not set to "wildcard" in step 906, then a test is done in step 907 to determine if Opcode 602 is set to "multiple wildcard". If Opcode 602 is set to "multiple wildcard" in step 907, then the pointer is held in step 908 and a branch is taken back to step 902. If Opcode 602 is not set to "multiple wildcard" in step 907, then in step 909 the pointer is reloaded and a branch is taken back to step 902.

The operations discussed relative to FIG. 9 are called regular expression matching. These regular expressions are used within matching modes used by the PPDE incorporating multiple PU 500 units according to embodiments of the present invention.

Figure 11A:
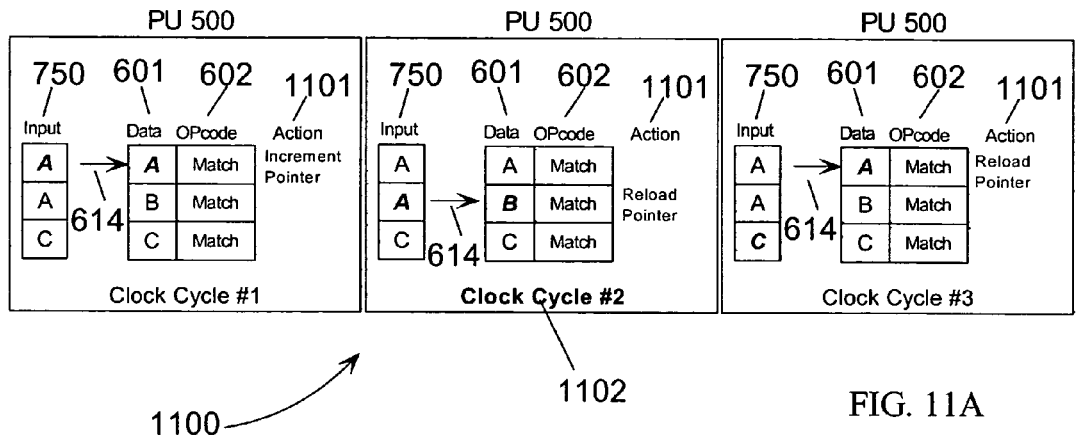
FIG. 11A–11E illustrate operation in various modes of pattern matching according to embodiments of the present invention.

FIGS. 11A–11F actions taken relative to a pattern 601 when comparing to an input data stream 750. FIG. 11A illustrates three clock cycles of the case 1100 where input data 750 is "AAC" being compared to pattern data 601 as "ABC" where each pattern byte has an Opcode 602. The actions 1101 are taken in response to the Opcodes 602. In clock cycle 1, pointer 614 starts at the byte ("A") in pattern 601. The first byte of input data 750 is also an "A". Opcode 602 for the first byte in pattern 601 is set to "match". Since the first byte of input data 750 and pattern 601 compare and Opcode 601 is set to "match", the pointer is incremented moving to the second byte in pattern 601 which is a "B". This happens in one clock cycle, therefore, in the second clock cycle (labeled 1102 because it is significant to the particular pattern in FIG. 11A), the second byte in input pattern 750 ("A") is compared to the second byte in pattern 601 ("B"). The Opcode 602 for the second byte of pattern 602 is set to "match". Since these two bytes do not compare, the sequence "AB" in pattern 601 cannot match the first two bytes "AA" of input data 750 as required by the Opcode 602. Therefore, in clock cycle 2 (1102), pointer 614 is reloaded with the address of the first byte in pattern 602 and comparison begins again. In clock cycle 3, the third byte in input data 750 is compared to the first "A" in pattern 602.

Figure 11B:
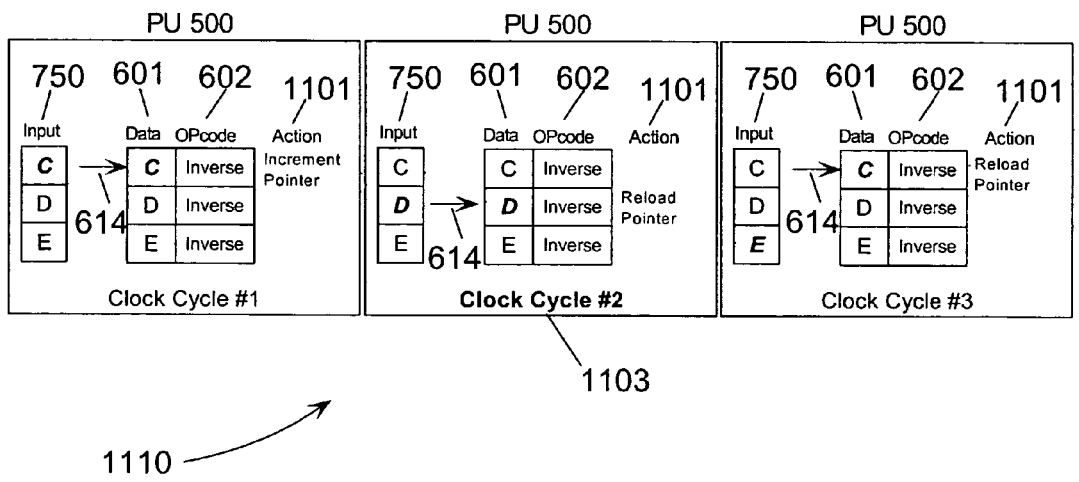

FIG. 11B illustrates the case 1110 where the bytes sequence of input data stream 750 as "CDE" does match pattern 602 as a "CDE" but an Opcode 602 on one of the pattern bytes is set to "inverse" indicating that a match between a byte in input data 750 and a byte in pattern 601 is not desired. In clock cycle 1, the first "C" in input data 750 matches the "C" in pattern 601 and the Opcode 602 is set to "match". Since this is a desired result the pointer 614 is incremented and the second byte ("D") of input data 750 is compared to the second byte ("D") of pattern 601 and these bytes do compare. However, the Opcode 602 is set to "inverse" and a match is not desired, therefore in clock cycle 2 (1103) the pointer 614 is reloaded and the first byte of pattern 601 is again selected. In clock cycle 3, the third byte "E" in input data 750 is compared to the first byte "C" of pattern 601. The example of FIG. 11B is "looking" for an input sequence "C!DE" where the "!D" indicates any character but not "D" is acceptable.

Figure 11C:
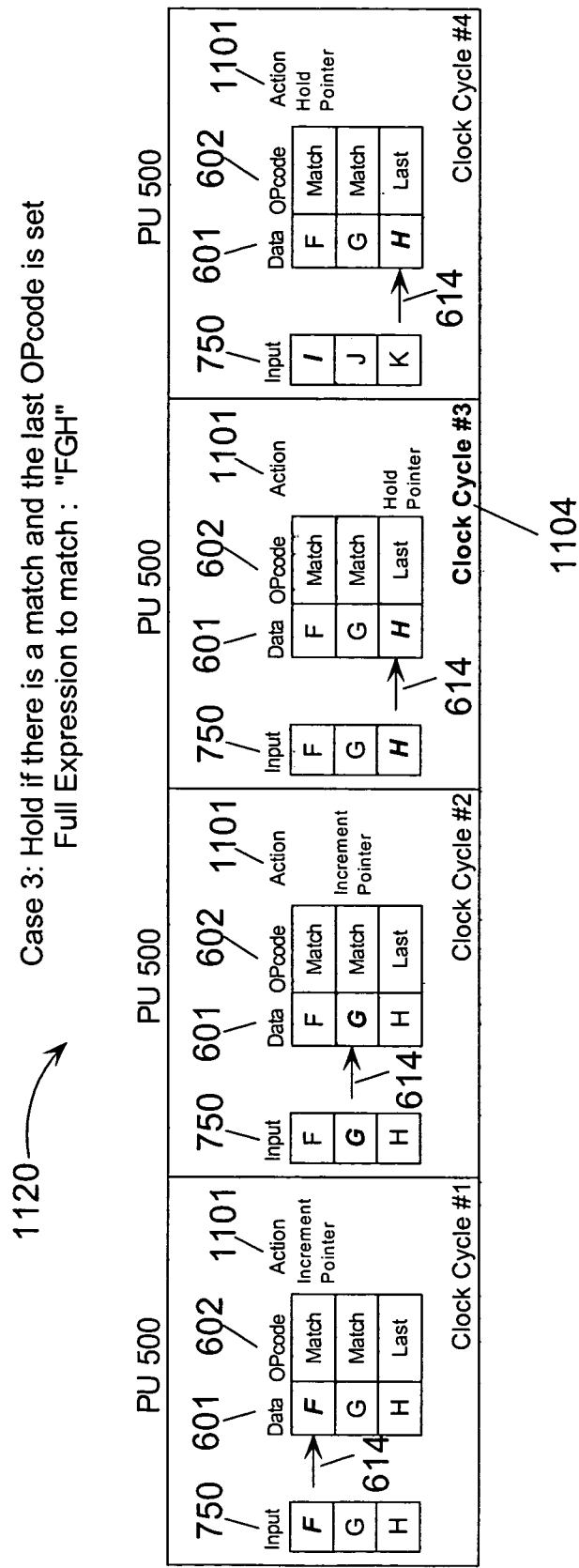

FIG. 11C illustrates case 1120 where a complete pattern 601 is shown with an Opcode 602 set to "last". In clock cycle 1, the first byte "F" in input data 750 matches with the first byte "F" in pattern 601 and Opcode 602 is set to "match". Since this is a correct result, pointer 614 is incremented. In clock cycle 2, the second byte "G" in input data 750 matches with the second byte "G" in pattern 601 and Opcode 602 is set to "match". Again, pointer 614 is incremented as this is a correct result. In clock cycle 3 (1104), the third byte "H" in input data 750 matches the third byte "H" in pattern 601. In this case, Opcode 602 is set to "last" indicating that the third byte is the last byte in a complete pattern 601 (in this case "FGH"). In this case the pattern "FGH" is detected in input data 750 and a match signal can be assert. Since there is additional input data 750, pointer 614 is reloaded back to the first byte in pattern 601 and the matching process continues "looking" for additional occurrences of the complete pattern "FGH" in succeeding bytes of input data 750.

Figure 11D:
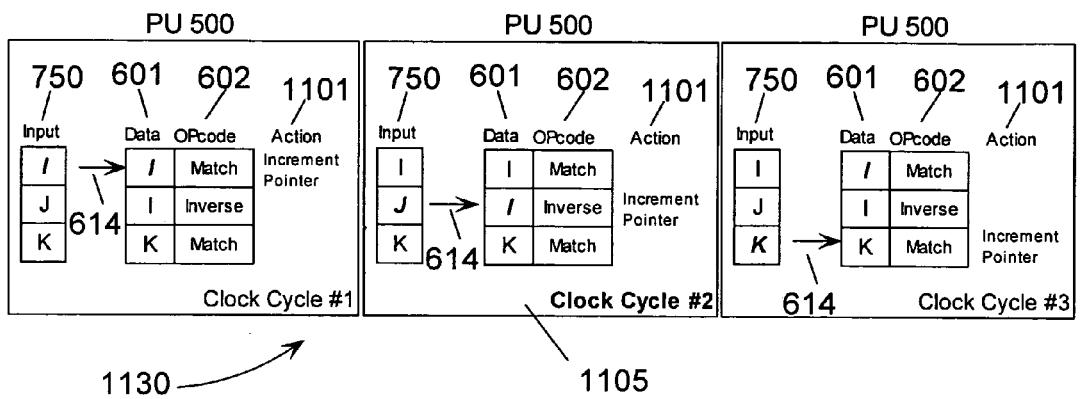

FIG. 11D illustrates case 1130 where a pattern 601 byte has Opcode 602 set to "inverse" and the bytes do not compare. In clock cycle 1, the first byte "I" in input data 750 matches the first byte "I" in pattern 601 and the Opcode 602 is set to "match". Since this is a desired result, the pointer 614 is incremented and the second byte ("J") of input data 750 is compared to the second byte ("I") of pattern 601 and these bytes do not compare. However, the Opcode 602 is set to "inverse" and no match is a desired result; therefore, in clock cycle 2 (1105), the pointer 614 is incremented and the third byte "K" of pattern 601 is again selected. In clock cycle 3, the third byte "K" in input data 750 is compared to the third byte "K" of pattern 601. Again, a match is detected and the pointer 614 is incremented. The example of FIG. 11D is "looking" for an input sequence "I!JK" where the "!J" indicates any character but "J" is acceptable.

Figure 11E:
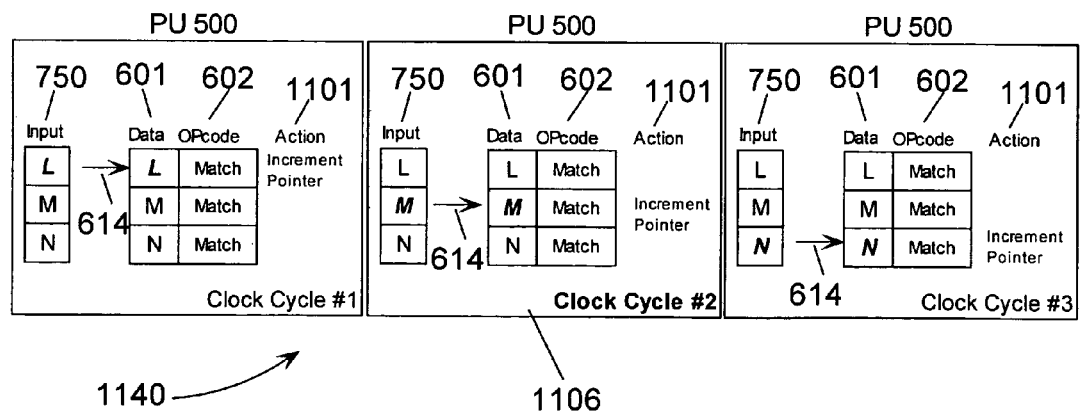

FIG. 11E illustrates case 1140 where pattern 601 matches a sequence in input data 750 and the Opcodes 602 are set to "match". In clock cycle 1, pointer 614 starts at the byte ("L") in pattern 601. The first byte of input data 750 is also an "L". Opcode 602 for the first byte in pattern 601 is set to "match". Since the first byte of input data 750 and pattern 601 compare and Opcode 601 is set to "match", the pointer 614 is incremented to the second byte in pattern 601 which is an "M". In the second clock cycle, the second byte in input pattern 750 ("M") is compared to the second byte in pattern 601 ("M"). The Opcode 602 for the second byte "M" of pattern 602 is set to "match". Since these two bytes compare, the pointer 614 is again incremented. In clock cycle 3, the third byte "N" in input data 750 is compared to the third byte "M" in pattern 602. Since they compare, the pointer is again incremented. FIG. 11E illustrates a partial match of "LMN" in pattern 601 to the sequence "LMN" in input data 750.

Figure 11F:
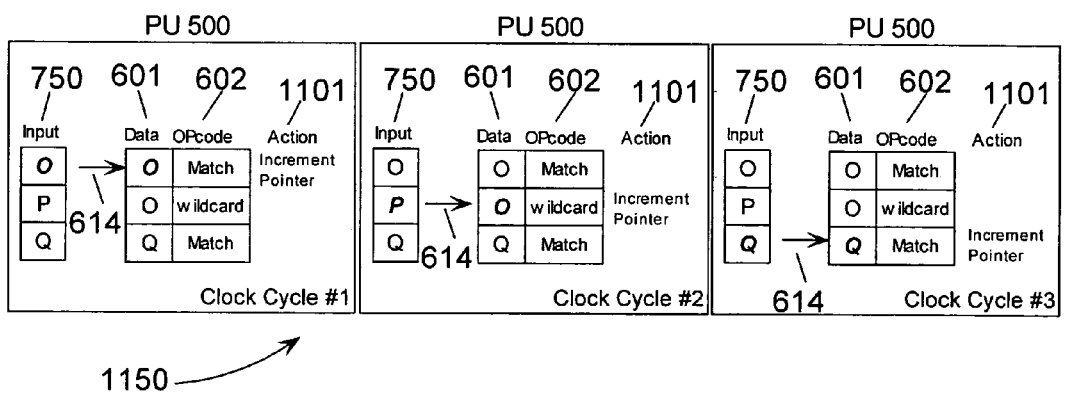
FIG. 11F–G illustrate various cases when there is not a pattern match in accordance with an embodiment of the present invention.

FIG. 11F illustrates case 1150 where there is NOT a pattern match and the wildcard Opcode is set for a byte in the pattern 601. In clock cycle 1, the "O" in input data 750 matches with the "O" in pattern 601. Since the Opcode 602 is set to "match", the pointer 614 is incremented. In clock cycle 2, second byte "O" of pattern 601 does not match the "P" in the second byte of input data 750. However, since Opcode 602 is set to "wildcard", any character is accepted and pointer 614 is again incremented. In clock cycle 3, the third byte "Q" of pattern 601 matches the third byte "Q" in input 750 and pointer 614 is incremented. In this case, the sequence "O•Q" is found where "•" indicates any character.

Figure 11G:
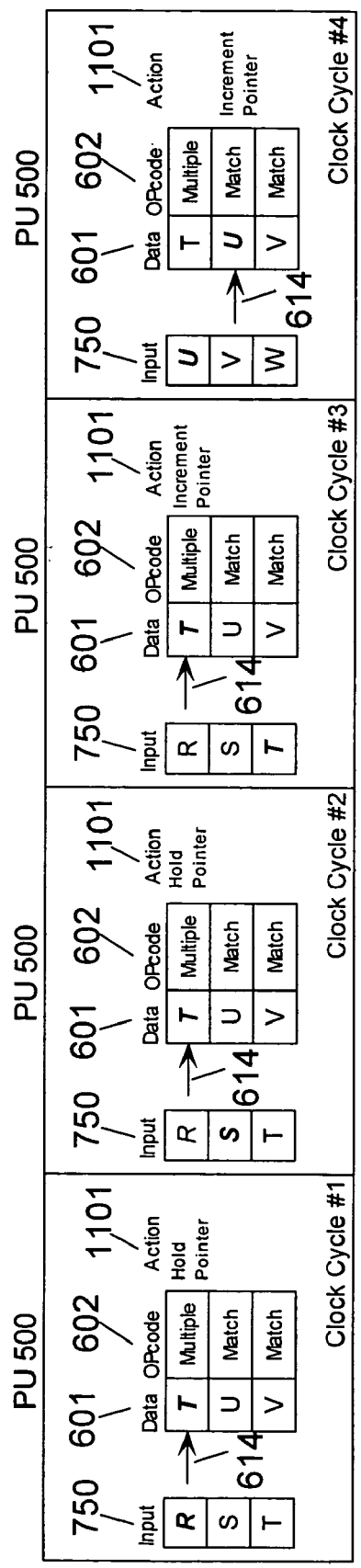
Figure 12:
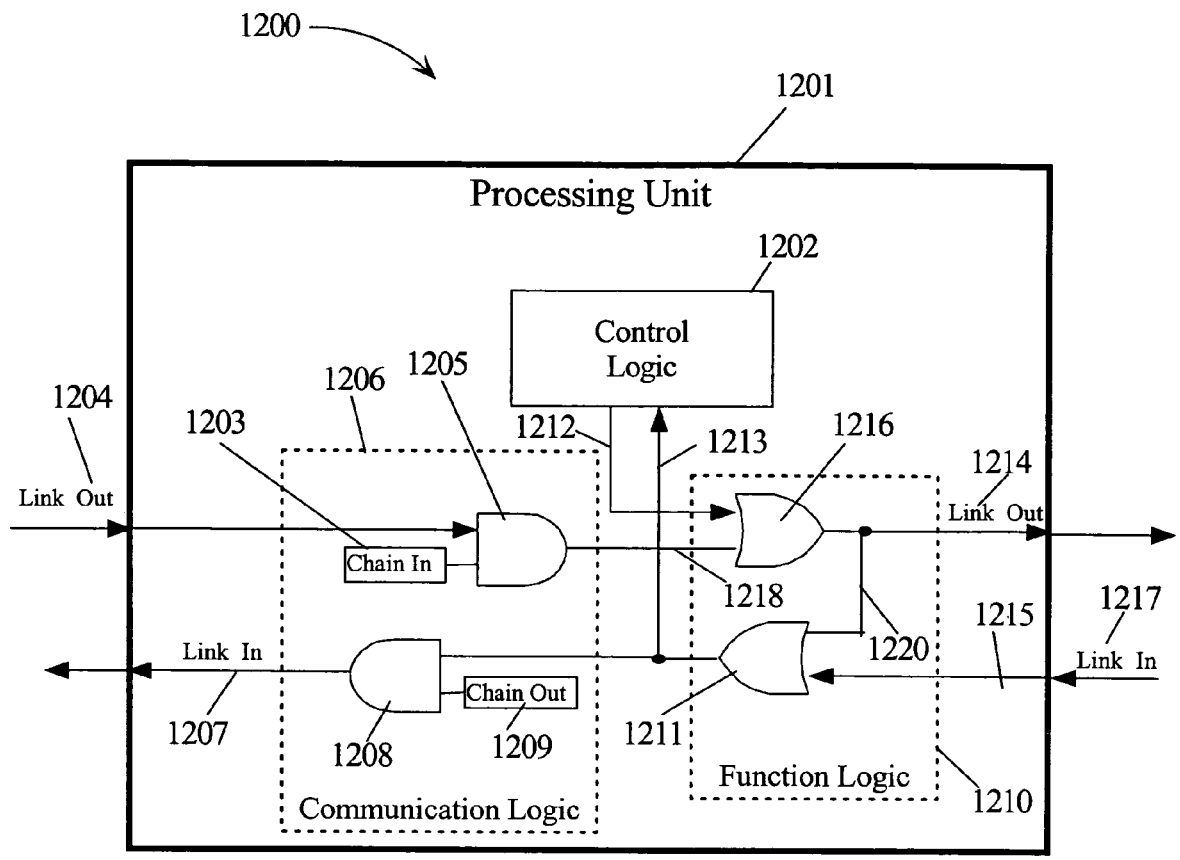
FIG. 12 illustrates a processing unit in accordance with an embodiment of the present invention.
Figure 13:
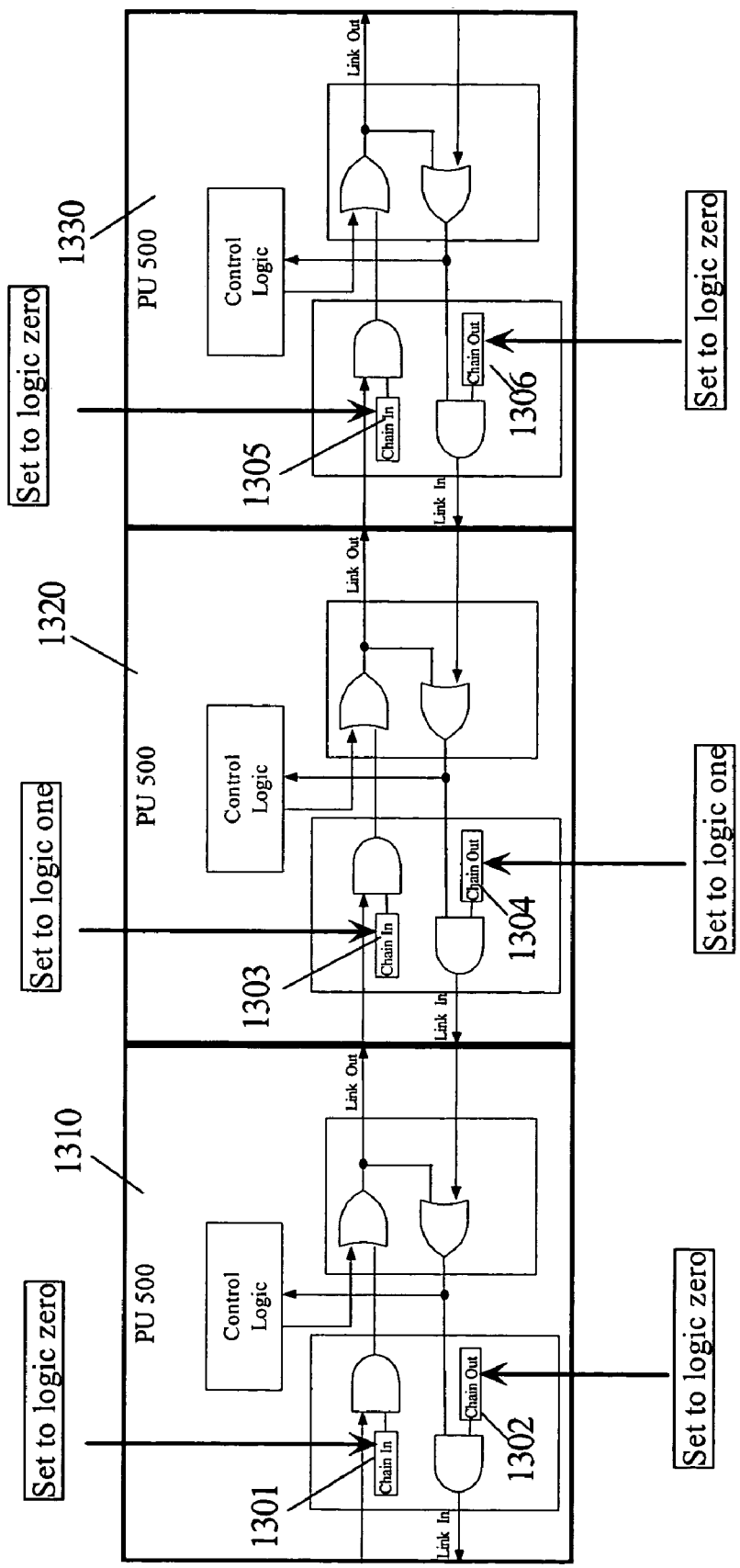
FIG. 13 illustrates the operations of pattern matching processing units in accordance with an embodiment of the present invention.

FIG. 11G illustrates case 1160 where there is not a pattern match and a byte of pattern 601 has the Opcode 602 set to "multiple wildcard" (shown as simply "multiple"). In clock cycle 1, the first byte "T" in pattern 601 does not match the first byte "R" in input data 750. However, since Opcode 602 is set to "multiple", the pointer 614 is held at its present position (in this case, first byte of pattern 601). In clock cycle 2, the first byte "T" of pattern 601 does not compare with the second byte in input data 750. Since Opcode 602 remains set to "multiple", the pointer 614 is held at the first byte of pattern 601. In clock cycle 3, the first byte "T" of pattern 601 does compare with the third byte of input data 750 and pointer 614 is incremented to the second byte of pattern 601. In clock cycle 4, the second byte of pattern 601 does compare with the fourth byte of input data 750 and the pointer 614 is again incremented. In clock cycle 5 (not shown), the third byte of pattern 601 matches the fifth byte in input data 750 and the pattern "TUV" is detected in input data 750.

The PPDE 100 has four matching modes: exact, longest, maximum and fuzzy. Exact matching may be used for aligned or non-aligned data and may incorporate the regular expressions such as single wildcard, multiple wildcard, inverse, or inclusive set. The exact matching mode may be utilized in applications such as network intrusion where line speed matching is critical and a binary match or not match response is only needed.

In the longest match mode, each PU 500 unit keeps track of the number of consecutive bytes matched and does not reset until the end of a pattern packet. In the longest match mode, each PU 500 outputs the number of matched bytes along with its ID to the ID selection unit 114 (FIG. 1A). ID selection unit 114 then outputs the ID of the PU 500 with the maximum number of matched bytes along with the length value of the longest match to the output buffer 105.

In the maximum matching mode, each PU 500 keeps track of the number of bytes matched and does not reset until the end of a pattern packet. In this mode, each PU 500 outputs the number of matched characters along with its ID to the ID selection unit 114. The ID selection unit 114 then outputs the ID of the PU 500 with the maximum number of matches and the value of the maximum number to the output buffer 105.

In the fuzzy matching mode, each PU 500 "looks" for the closed pattern and then outputs the ID of the PU 500 with the closest match and a corresponding distance value quantifying the closeness of the match to ID selection unit 114 which in turn outputs the results to the output buffer 105. The distance is the result of a comparison between the input Pattern and the Reference pattern (RP) previously stored in memory. The distance calculation method is based on a norm that is user selectable. Several norm can be used, the norm can uses the "absolute value of a difference" operator. The successive elementary distances can be summed in the case of the Manhattan distance, i.e. dist=sum (abs (IEi−REi)) or the maximum value thereof is selected in the case of the maximum norm to determine the final distance. i.e. dist=max (abs (IEi−REi)) where IEi (Input Element) and REi (Reference Element) are the components of rank i (variable i varies from 1 to k) for the input pattern IP and the stored prototype Reference pattern RP respectively. Note that "abs" is an usual abbreviation for "absolute value". Other norms exist, for instance the L2 norm such as dist=square root (sum (IEi−REi)$^2$. The L2 norm is said to be "Euclidean" while the Manhattan and maximum norms are examples of "non-Euclidean" norms. Other Euclidean or non-Euclidean norms (such as the match/no match) are known for those skilled in the art. In particular, the "match/no match" norm, represented by the "match (IEi, REi)" operator is extensively used. The closest match is the pattern with the lowest result. Fuzzy matching is useful in image processing and real time data processing where the input data stream may have white noise superimposed on data.

Figure 2A:
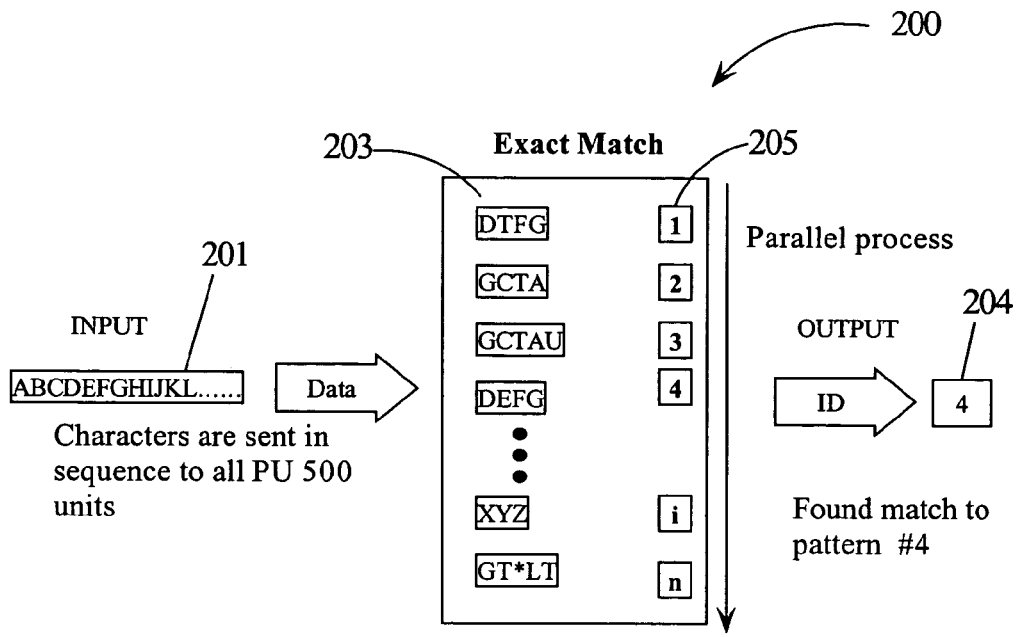
FIG. 2A–2D are block diagrams of four matching modes which may be programmed for each of the N processing units (PUs) of FIG. 1.

FIG. 2A illustrates an example of the exact matching mode 200 using a PPDE 100 according to embodiments of the present invention. Patterns 203 correspond to ID numbers 205 numbered 1-n and identify n PU 500 units incorporated into a PPDE 100. Input pattern 201 would be sent in parallel to each of the n PU 500 units. In this mode, PPDE 100 is programmed to find if any of the n patterns are found in input data stream 201. By inspection, one can see that only pattern "4" is found in its exact sequence in the portion of input data stream 201 shown. In this case, the ID of the PU 500 with the exact match (in this case, "4" is the ID) would be outputted (output 204) to ID selection unit 114 (not shown) which would send the value to output buffer 105 (not shown).

Figure 2B:
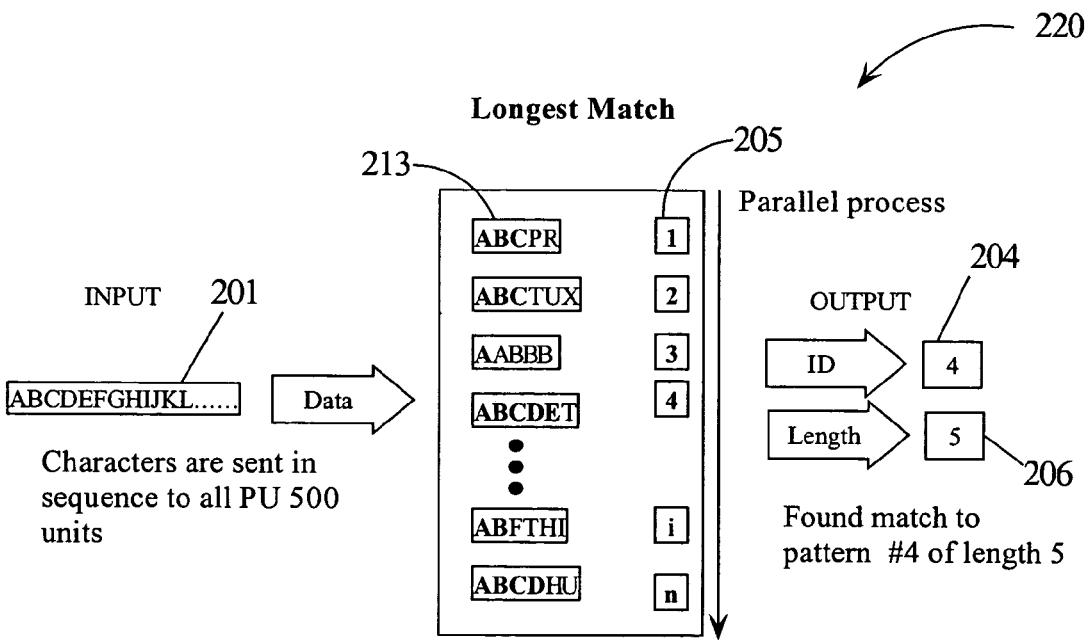

FIG. 2B illustrates an example of the longest match mode 220 using a PPDE 100 according to embodiments of the present invention. Again, input data stream 201 is coupled in parallel to n PU 500 units with ID numbers 205 numbered 1-n. In this mode, PPDE 100 is programmed to determine the most consecutive bytes in the patterns 213 that appear in input data stream 201. Again, by inspection one can see that pattern "4" has the longest match with 5 consecutive bytes "ABCDE" appearing in the input data stream 201. In this case, the ID of the PU 500 with the longest match (in this case, "4" is the ID) would be outputted (output 204) along with the longest match value of "5" (output 206) to ID selection unit 114 (not shown) which would send the value to output buffer 105 (not shown).

Figure 2C:
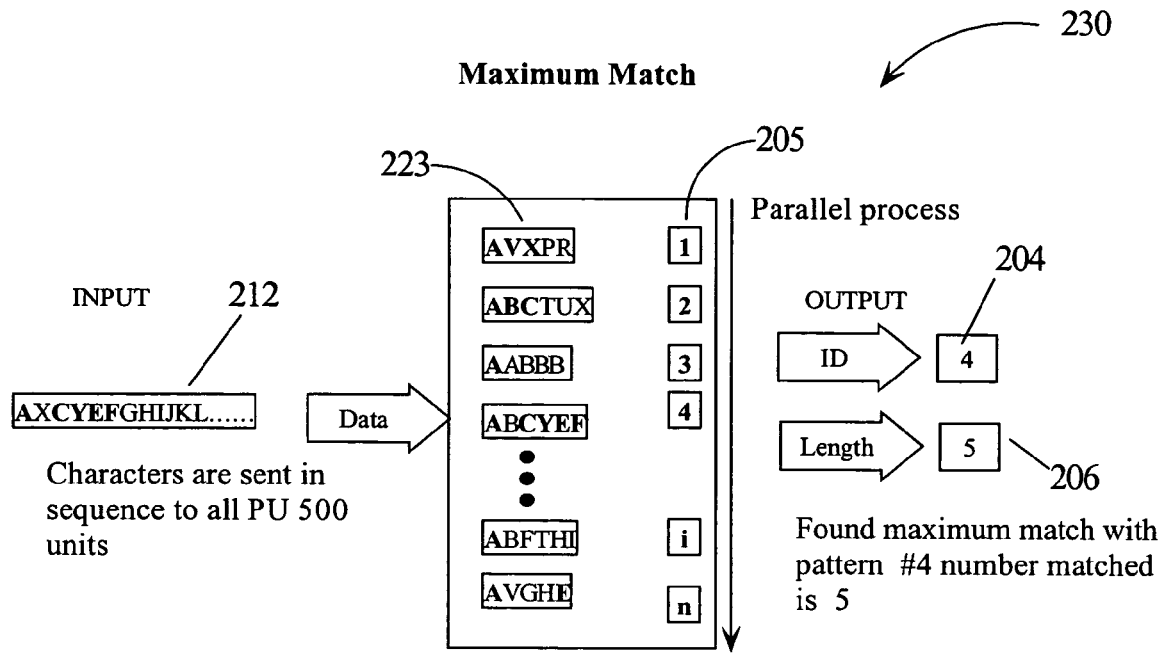

FIG. 2C illustrates an example of the maximum match mode 230 using a PPDE 100 according to embodiments of the present invention. Again input data stream 212 is coupled in parallel to n PU 500 units with ID numbers 205 numbered 1-n. In this mode PPDE 100 is programmed to determine the maximum number of bytes in the patterns 223 that appear in input data stream 212 not necessarily in consecutive order. Again, by inspection one can see that pattern "4" has the maximum number with 5 matching bytes "ACYEF" appearing in the input data stream 212. In this case, the ID of the PU 500 with the maximum number of matches (in this case, "4" is the ID) (output 204) along with the maximum number value of "5" (output 206) are outputted to ID selection unit 114 (not shown) which would send the value to output buffer 105 (not shown).

Figure 2D:
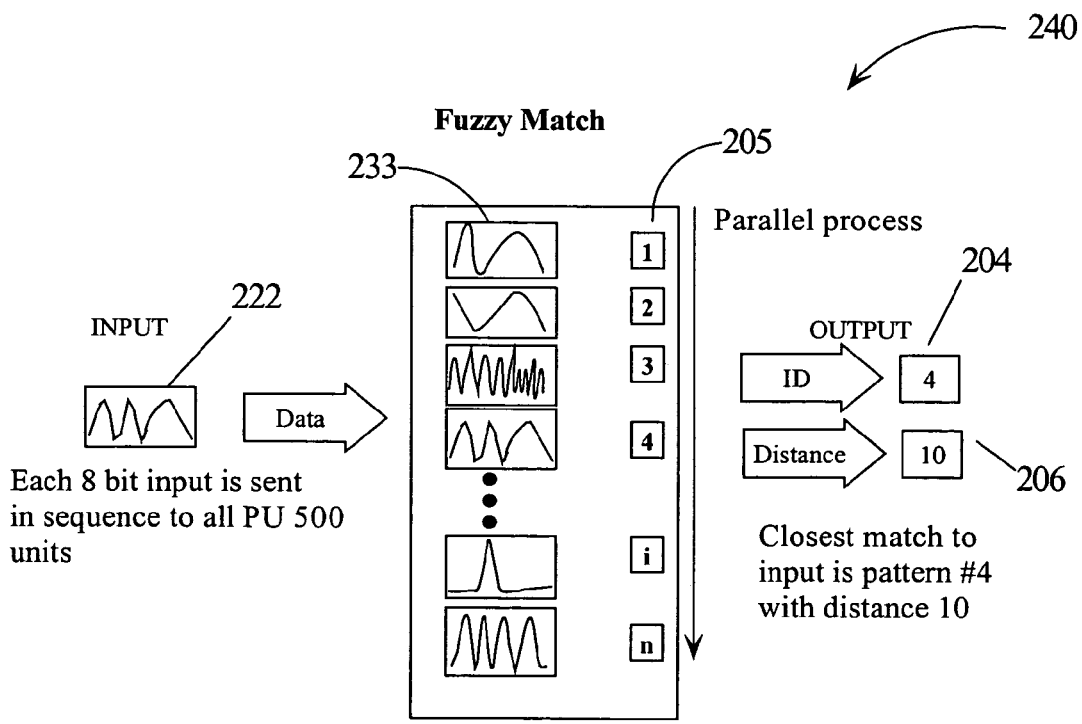

FIG. 2D illustrates an example of the fuzzy match mode 240 using a PPDE 100 according to embodiments of the present invention. Input data stream 222 is coupled in parallel to n PU 500 units with ID numbers 205 numbered 1-n. In this example, input data stream 222 is an analog signal which would be digitized and each 8 bit input value would be sent to the n PU 500 units in parallel. In this mode, PPDE 100 is programmed to determine which of the patterns 233 most closely matches input data stream 222. Again, by inspection one can see that pattern "4" has the closest match. In actual operation, distance circuitry 611 (not shown) would be used to make this determination. In this case, the ID of the PU 500 with the closest match (in this case, "4" is the ID) (output 204) along with the distance value of "10" (output 206) would be outputted to ID selection unit 114 (not shown) which would send the value to output buffer 105 (not shown).

Figure 3:
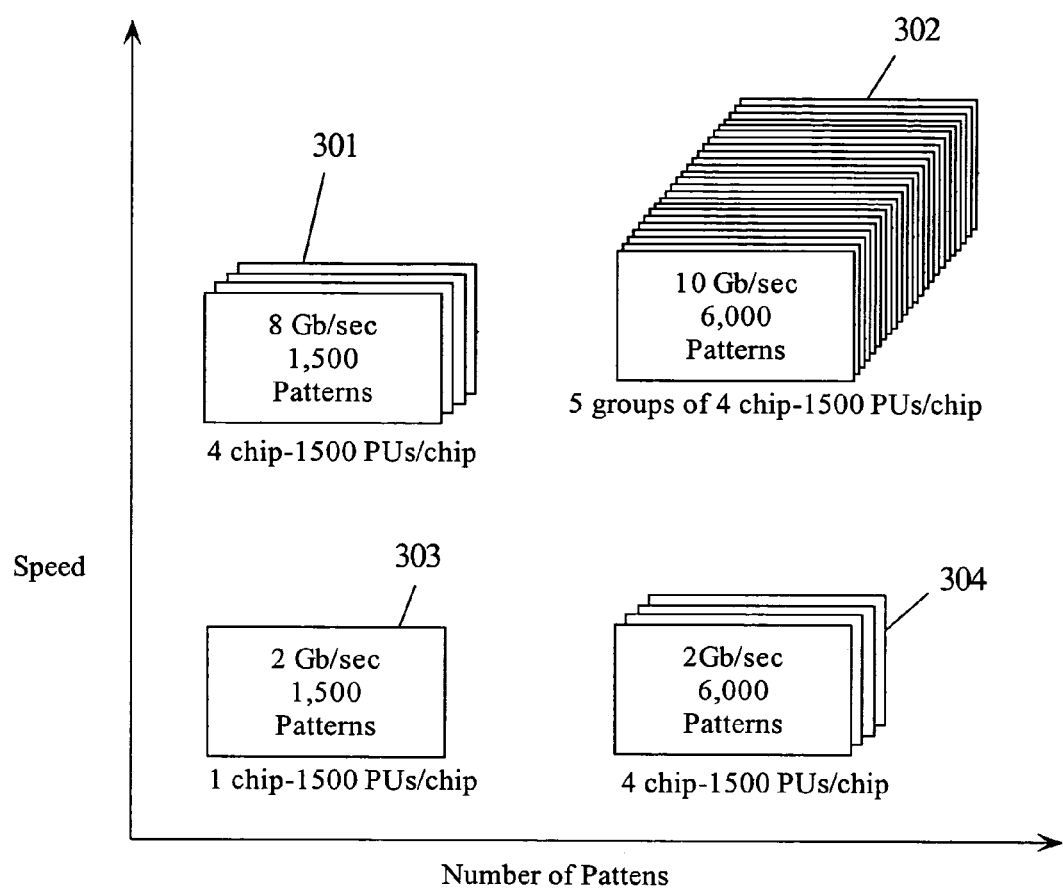
FIG. 3 is a chart illustrating the various modes of scalability of the PPDE of the present invention.

FIG. 3 is a block diagram illustrating the scalability of PPDE 100. The architecture of PPDE 100 allows for multiple chips to be cascaded. This feature may be used to either increase the number of processing units or to increase the performance by splitting the input data amongst the several chips. FIG. 3 illustrates the direct correlation between the number of chips and the number of PU 500 units. Block 303 shows the standard performance of one PPDE 100 chip. As PPDE 100 chips are added (by cascading) along the X axis the performance increases. Also, as the number of PU 500 units per PPDE 100 chip are added along the Y axis, the performance increases. Block 301 illustrates that by adding 4 chips (1500 PU 500 units) processing is increased to 8 Gb/sec for 1500 patterns. Block 304 illustrates using 4 chips to increase the number of patterns while maintaining the processing speed of 2 Gb/sec. Block 302 illustrates adding 5 groups of 4 chips coupled to process 6000 patterns to allow a system that can process 6000 patterns at 10 Gb/sec.

Figure 4:
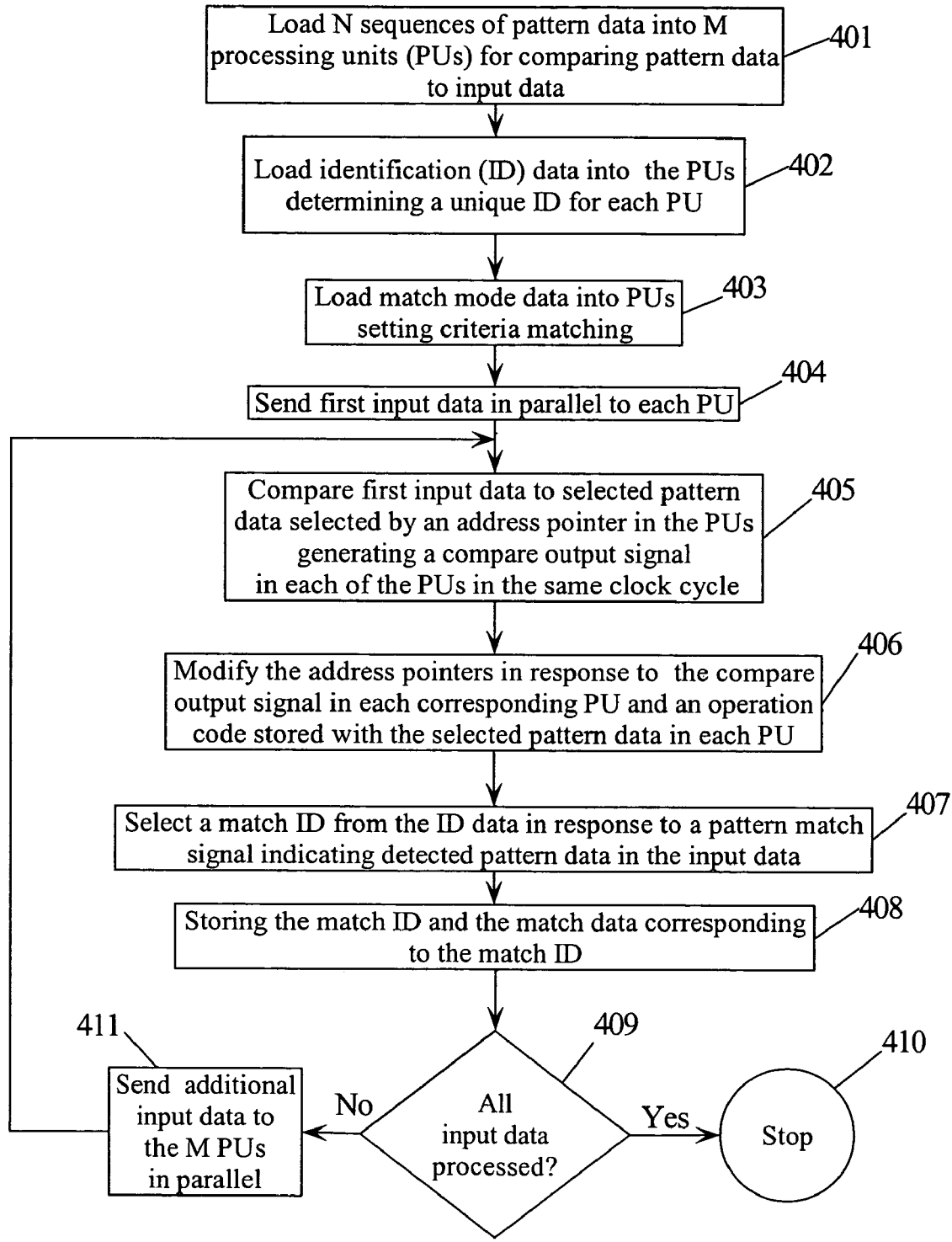
FIG. 4 is a flow diagram of methods steps used in embodiments of the present invention.

FIG. 4 is a flow diagram of method steps used in embodiments of the present invention. In step 401, an N sequences of pattern data are loaded into M processing units (PUs) 500 for comparing pattern data to input data. In step 402, identification data (ID) determining a unique ID for each PU 500 is loaded into each PU 500. In step 403, match mode data is loaded into each PU 500 setting criteria for indicating a match has occurred between selected pattern data and input data. In step 404, the first input data is sent in parallel to each of the M PU 500 units. In step 405, the first input data is compared to selected pattern data selected by an address pointer in the PU 500 units thereby generating a compare output signal in each of the M 0PU 500 units in the same clock cycle. In step 406, the address pointers in each PU 500 unit is modified in response to a logic state of the compare output signal and an operation code stored with the selected pattern data in each PU unit. In step 407, a match ID is selected from the ID data in response to a pattern match signal indicating selected pattern data has been detected in the input data. In step 408, the match ID and the match data corresponding to the match ID are stored. In step 409, a test is done to determine if all the input data has been processed. If the result of the test in step 409 is NO, then in step 411 additional input data is sent to the PU 500 units in parallel. If the result of the test in step 409 is YES, then in step 410 the process is stopped.

Figure 10:
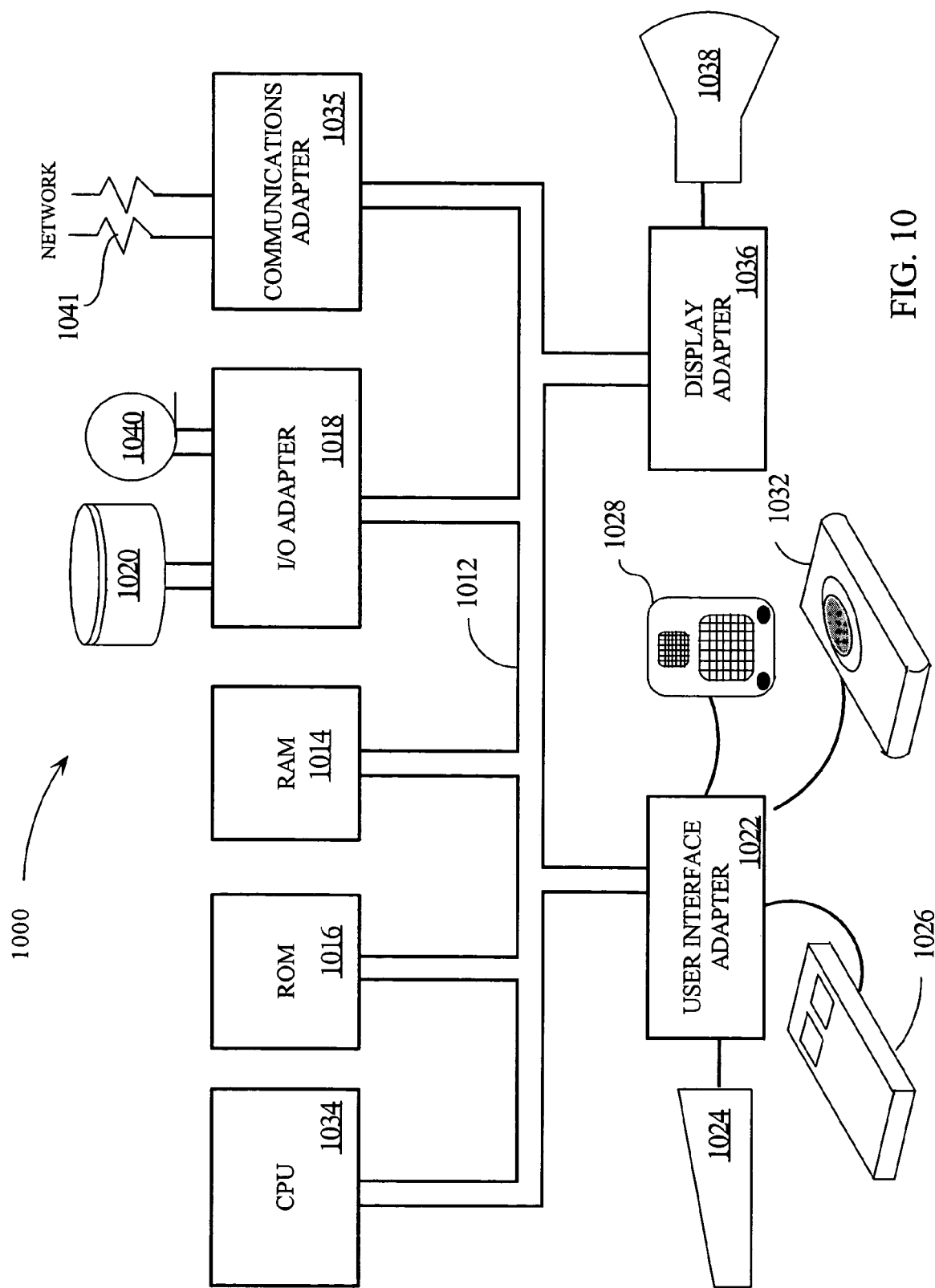
FIG. 10 is a data processing system suitable for practicing embodiments of the present invention.

A representative hardware environment for practicing the present invention is depicted in FIG. 10, which illustrates a typical hardware configuration of a workstation in accordance with the subject invention having central processing unit (CPU) 1034 with one PPDE or a plurality of PPDEs 100 chips and other units interconnected via system bus 1012. The workstation shown in FIG. 10 includes random access memory (RAM) 1014, read only memory (ROM) 1016, and input/output (I/O) adapter 1018 for connecting peripheral devices such as disk units 1020 and tape drives 1040 to bus 1012, user interface adapter 1022 for connecting keyboard 1024, mouse 1026, speaker 1028, microphone 1032, and/or other user interface devices such as a touch screen device (not shown) to bus 1012, communication adapter 1035 for connecting the workstation to a data processing network, and display adapter 1036 for connecting bus 1012 to display device 1038. Input data 120 (input data stream, pattern data, and various control data) may be provided to the PPDE 100 chips in CPU 1034 from various sources including network 1041, disk unit 1020, tape drives 1040 or form various input devices such as microphone 1032, keyboard 1024, etc. Other input devices, such as fingerprint readers and voice recognition units, may provide input data streams that are matched against stored patterns using one or more PPDE 100 chips according to embodiments of the present invention.

Although the present invention and its advantages have been described in detail, it should be understood that various changes, substitutions and alterations can be made herein without departing from the spirit and scope of the invention as defined by the appended claims.

What is claimed is:

1. A parallel pattern detection engine (PPDE) integrated circuit (IC) for detecting one or more patterns in a sequence of input data comprising:

an input/output (I/O) interface for coupling data into and out of the PPDE;

M processing units (PUs), each of the M PUs having compare circuitry for comparing each of the sequence of input data to a pattern stored in each of the M PUs and generating a compare output, wherein an address pointer points to the pattern in each of the M PUs, wherein the address pointer is modified in response to a logic state of the compare output and an operation code stored with the pattern;

an input bus for coupling the sequence of input data to each of the M PUs in parallel;

an output bus coupled to the I/O interface for sending output data to the I/O interface;

control circuitry coupled to the I/O interface and coupling control data on a control data bus and identification (ID) on an ID bus to each of the M PUs;

ID selection circuitry for selecting a match ID from ID data identifying the M PUs in response to a pattern match signal and match mode data, wherein the match ID and match data corresponding to the match ID are saved in a temporary register as the output data; and cascade circuitry coupled from each of the M PUs to one or more adjacent PUs within the M PUs for selectively coupling chain data between one or more groups of two or more adjacent PUs selected from the M PUs in response to the control data.

2. The PPDE of claim 1 further comprising an input buffer coupled to the I/O interface for receiving and writing input data as parallel data at a write address.

3. The PPDE of claim 2 further comprising a multiplexer coupled to the input bus and the input buffer for sequentially coupling single data from the input buffer data to the input bus, wherein parallel data are selected using a read address.

4. The PPDE of claim 1 further comprising an output buffer coupled to the output bus and to the temporary register for receiving and writing output data to the output buffer at a write address and coupling output data to the output bus corresponding to a read address.

5. The PPDE of claim 1, wherein each of M processing units (PUs) has an ID register for storing a unique ID sent from the control circuitry.

6. The PPDE of claim 1, wherein each of M processing units (PUs) has a control register for storing the match mode data, wherein the match mode data determines criteria for generating the match signal and the match data.

7. The PPDE of claim 1, wherein each of the M PUs has a memory register array for storing a sequence of the pattern and corresponding operation codes addressed by an address register indexed by the address pointer.

8. The PPDE of claim 1, wherein the cascade circuitry enables the stored patterns of two or more PUs to be chained together as a single pattern using the chain data.

9. The PPDE of claim 8, wherein the chain data inhibits indexing the pointer of one PU until an adjacent PU coupled with the cascade circuitry has compared a last pattern to an input data.

10. The PPDE of claim 1, wherein the compare circuitry in each of the M PUs completes a compare of an input data to a selected pattern and generates a compare output and modifies the address pointer in the same cycle of a clock signal.

11. The PPDE of claim 1, wherein the match mode data for each of the M PUs sets a match mode comprising:

an exact match mode, wherein a pattern match indicates that the sequence of pattern matches a sequence of input data exactly;

a longest match mode wherein a pattern match indicates that a particular sequence of pattern corresponding to the match ID has the largest number of data in a sequence that compared to a sequence of data in the sequence of input data wherein the match data indicates the value of the largest number;

a maximum match mode, wherein a pattern match indicates that a particular sequence of pattern bytes corresponding to the match ID has the largest number of data that compared in a broken sequence that compared to a broken sequence of input data, wherein the match data indicates the value of the largest number; and a fuzzy match mode, wherein a pattern match indicates that a particular sequence of pattern corresponding to the match ID has the closest match to the sequence of input data as determined by a distance value, wherein the match data indicates the distance value.

12. The PPDE of claim 1, wherein the operation codes are selected from a set of operation codes comprising:

a match operation code indicating that the address pointer is incremented if the compare output is a logic one and the address pointer is reloaded to its initial value if the compare output is a logic zero;

an inverse operation code indicating that the address pointer is to be incremented if the compare output is a logic zero and the address pointer is reloaded to its initial value if the compare output is a logic one;

a wildcard operation code indicating that the address pointer is incremented if the compare output is a logic zero or a logic one;

a multiple wild card operation code indicating that the address pointer is to be held if the compare output is a logic zero otherwise the address pointer is incremented; and a last operation code indicating that the address pointer is frozen until the matching process receives a reset if the compare output is a logic one and the address pointer is reloaded to its initial value if the compare output is a logic zero.

13. The PPDE of claim 1, wherein bits of the selected pattern are masked by a mask data stored in a mask register when the selected pattern is compared to an input data, the mask data indicating which bits of the selected pattern are not compared.

14. A data processing system comprising:

a central processing unit (CPU);

a random access memory (RAM);

one or more parallel pattern detection engines (PPDEs); and a bus coupling the CPU, RAM, and the one or more PPDEs, wherein each of the PPDEs has an input/output (I/O) interface for coupling data into and out of the PPDE;

M processing units (PUs), each of the M PUs having compare circuitry for comparing each of a, sequence of input data to a pattern stored in each of the M PUs and generating a compare output, wherein an address pointer points to the pattern in each of the M PUs, wherein the address pointer is modified in response to a logic state of the compare output and an operation code stored with the pattern;

an input bus for coupling the sequence of input data to each of the M PUs in parallel;

an output bus coupled to the I/O interface for sending output data to the I/O interface;

control circuitry coupled to the I/O interface and coupling control data on a control data bus and identification (ID) on an ID bus to each of the M PUs;

ID selection circuitry for selecting a match ID from ID data identifying the M PUs in response to a pattern match mode signal and match mode data, wherein the match ID and match data corresponding to the match ID are saved in a temporary register as the output data; and cascade circuitry coupled from each of the M PUs to one or more adjacent PUs within the M PUs for selectively coupling chain data between one or more groups of two or more adjacent PUs selected from the M PUs in response to the control data.

15. The data processing system of claim 14, wherein each of M processing units (PUs) has an ID register for storing a unique ID sent from the control circuitry.

16. The data processing system of claim 14, wherein each of the M PUs has a memory register array for storing a sequence of the pattern and corresponding operation codes addressed by an address register indexed by the address pointer.

17. The data processing system of claim 14, wherein the cascade circuitry enables the stored patterns of two or more PUs to be chained together as a single pattern using the chain data.

18. The data processing system of claim 17, wherein the chain data inhibits indexing the pointer of one PU until an adjacent PU coupled with the cascade circuitry has compared a last pattern to an input data.

19. The data processing system of claim 14, wherein the compare circuitry in each of the M PUs completes a compare of an input data to a selected pattern and generates a compare output and modifies the address pointer in the same cycle of a clock signal.

20. The data processing system of claim 14, wherein the match mode data for each of the M PUs sets a match mode comprising:

an exact match mode, wherein a pattern match indicates that the sequence of pattern matches a sequence of input data exactly;

a longest match mode wherein a pattern match indicates that a particular sequence of pattern corresponding to the match ID has the largest number of data in a sequence that compared to a sequence of data in the sequence of input data wherein the match data indicates the value of the largest number;

a maximum match mode, wherein a pattern match indicates that a particular sequence of pattern corresponding to the match ID has the largest number of data that compared to a broken sequence of input data, wherein the match data indicates the value of the largest number; and a fuzzy match mode, wherein a pattern match indicates that a particular sequence of pattern corresponding to the match ID has the closest match to the sequence of input data as determined by a distance value, wherein the match data indicates the distance value.

21. The data processing system of claim 20, wherein the operation codes are selected from a set of operation codes comprising:

a match operation code indicating that the address pointer is incremented if the compare output is a logic one and the address pointer is reloaded to its initial value if the compare output is a logic zero;

an inverse operation code indicating that the address pointer is to be incremented if the compare output is a logic zero and the address pointer is reloaded to its initial value if the compare output is a logic one;

a wildcard operation code indicating that the address pointer is incremented if the compare output is a logic zero or a logic one;

a multiple wildcard operation code indicating that the address pointer is to be held if the compare output is a logic zero otherwise the address pointer is incremented; and a last operation code indicating that the address pointer is frozen until the matching process receives a reset if the compare output is a logic one and the address pointer is reloaded to its initial value if the compare output is a logic zero.

22. The data processing system of claim 20, wherein bits of the selected pattern are masked by a mask data stored in a mask register when the selected pattern is compared to an input data, the mask data indicating which bits of the selected pattern are not compared.

* * * * *